(12) United States Patent
Yang et al.

(10) Patent No.: US 12,475,244 B2
(45) Date of Patent: Nov. 18, 2025

(54) DATA ACCESS METHOD AND APPARATUS, AND ELECTRONIC DEVICE

(71) Applicant: HUAWEI TECHNOLOGIES CO., LTD., Guangdong (CN)

(72) Inventors: Jiachen Yang, Shenzhen (CN); Feng Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 233 days.

(21) Appl. No.: 18/254,151

(22) PCT Filed: Nov. 29, 2021

(86) PCT No.: PCT/CN2021/133925
§ 371 (c)(1),
(2) Date: May 23, 2023

(87) PCT Pub. No.: WO2022/111680
PCT Pub. Date: Jun. 2, 2022

(65) Prior Publication Data
US 2024/0028756 A1    Jan. 25, 2024

(30) Foreign Application Priority Data
Nov. 30, 2020  (CN) .......................... 202011380592.6

(51) Int. Cl.
*H04L 29/06* (2006.01)
*G06F 21/60* (2013.01)
*G06F 21/62* (2013.01)

(52) U.S. Cl.
CPC ........ *G06F 21/6218* (2013.01); *G06F 21/604* (2013.01); *G06F 2221/2141* (2013.01)

(58) Field of Classification Search
CPC .............. G06F 21/6218; G06F 21/604; G06F 2221/2141; G06F 21/36; G06F 21/60
See application file for complete search history.

(56) References Cited

U.S. PATENT DOCUMENTS 8,224,873 B1 * 7/2012 Korablev ................ H04L 63/08
707/809
9,680,838 B1 * 6/2017 Hodge ................ H04L 65/1073
(Continued)

FOREIGN PATENT DOCUMENTS

| CN | 104954330 A | 9/2015 |
| CN | 111177690 A | 5/2020 |

(Continued)

*Primary Examiner* — Shawnchoy Rahman

(57) ABSTRACT

In an access method, when a first account logged in to a current device triggers a data access operation on user data, the current device generates a first access request corresponding to the data access operation. The current device sends the first access request to a storage device, and receives a permission verification request from the storage device. The current device generates an access authorization request based on the permission verification request, and sends the access authorization request to a first device. Thereafter, the current device receives authorization verification information from the first device. The current device then generates, based on the authorization verification information, a second access request corresponding to the data access operation, and sends the second access request to the storage device.

14 Claims, 18 Drawing Sheets

(56) References Cited

U.S. PATENT DOCUMENTS

| | | | | |
|---|---|---|---|---|
| 11,082,428 | B2* | 8/2021 | Farah | H04L 63/10 |
| 11,238,181 | B2* | 2/2022 | Khan | H04L 63/0807 |
| 12,094,604 | B2* | 9/2024 | Davydov | G16H 50/30 |
| 2005/0154911 | A1* | 7/2005 | Schneider | H04L 63/0853 |
| | | | | 726/2 |
| 2015/0310188 | A1* | 10/2015 | Ford | H04L 63/101 |
| | | | | 726/28 |
| 2018/0262510 | A1* | 9/2018 | Su | G06F 21/6218 |
| 2022/0014384 | A1* | 1/2022 | Sun | H04L 9/085 |

FOREIGN PATENT DOCUMENTS

| | | | | |
|---|---|---|---|---|
| CN | 111680274 A | 9/2020 | | |
| WO | WO-2019183810 A1 | * 10/2019 | | H04L 67/06 |

\* cited by examiner

DATA ACCESS METHOD AND APPARATUS, AND ELECTRONIC DEVICE

CROSS-REFERENCE TO RELATED APPLICATIONS

This application is a National Stage of International Application No. PCT/CN2021/133925, filed on Nov. 29, 2021, which claims priority to Chinese Patent Application 202011380592.6, filed on Nov. 30, 2020. Both of the aforementioned applications are hereby incorporated by reference in their entirety.

TECHNICAL FIELD

This application relates to the field of intelligent terminal technologies, and in particular, to a data access method and apparatus, and an electronic device.

BACKGROUND

With continuous development of information technologies and multimedia technologies, an increasing amount of data on a terminal device of a user is caused. This often leads to insufficient storage space of the terminal device. For example, as a mobile phone user continuously uses a mobile phone to take pictures and shoot videos, the pictures and the videos usually occupy storage space of the mobile phone. This leads to the insufficient storage space of the mobile phone.

For the foregoing problem, a feasible solution is a network storage solution, in which the data on the terminal device is transferred to a storage device connected to a network, to release the storage space of the terminal device. When the terminal device needs to access the transferred data, the terminal device is connected to the storage device through the network, and accesses the data stored on the storage device online.

Although the foregoing network storage solution can resolve the problem of the insufficient storage space of the terminal device, in many application scenarios, the storage device connected to the network is allowed to be shared, and a plurality of terminal devices on the network can all access the storage device. As a result, the data on the storage device is easily accessed and tampered unauthorizedly, and a security problem of storing the data occurs. For example, a user A deletes data stored by a user B on a storage device without a permission of the user B. For another example, the user A copies the data stored by the user B on the storage device without the permission of the user B.

Therefore, a data access method is needed to resolve a security problem of accessing the data on the storage device in the network.

SUMMARY

To resolve a security problem of accessing data on a storage device in a network in a current technology, this application provides a data access method and apparatus, and an electronic device, and this application further provides a computer-readable storage medium.

The following technical solutions are used in embodiments of this application.

According to a first aspect, this application provides a data access method, including:

when a first account logged in to a current device triggers a data access operation on user data, generating a first access request corresponding to the data access operation, where the user data is stored on a storage device and belongs to a second account;

sending the first access request to the storage device;

receiving a permission verification request fed back by the storage device, where the permission verification request corresponds to the first access request, and is used to request to obtain authorization verification information for the data access operation from the current device;

generating an access authorization request based on the permission verification request, where the access authorization request is used to request a first device to negotiate with the storage device based on access authorization information to generate the authorization verification information, and the access authorization information is an authorization result generated by the second account by performing access authorization on the data access operation;

outputting the access authorization request to the first device;

receiving the authorization verification information from the first device;

generating, based on the authorization verification information, a second access request corresponding to the data access operation; and sending the second access request to the storage device.

In a feasible implementation of the first aspect, the first device is a user terminal device to which the second account is logged in; and the access authorization request is further used to request the second account logged in to the first device to perform the access authorization.

In a feasible implementation of the first aspect, the access authorization request is two-dimensional code data; and the outputting the access authorization request to the first device includes: presenting, to the first device, a two-dimensional code corresponding to the two-dimensional code data.

In a feasible implementation of the first aspect, a second device is a user terminal device to which the second account is logged in; and the access authorization request is further used to request the first device to initiate a request authorization operation to the second device, where the request authorization operation is used to request the second account logged in to the second device to perform the access authorization.

In a feasible implementation of the first aspect, a second device is a user terminal device to which the second account is logged in, and the method further includes:

generating a user authorization request based on the permission verification request, where the user authorization request is used to request the second account logged in to the second device to perform the access authorization; and outputting the user authorization request to the second device.

In a feasible implementation of the first aspect, the user authorization request is two-dimensional code data; and the outputting the user authorization request to the second device includes: presenting, to the second device, a two-dimensional code corresponding to the two-dimensional code data.

According to a second aspect, this application provides a data access authorization method, including:

obtaining an access authorization request from a first device, where the access authorization request corresponds to a data access operation on user data, the user data is stored on a storage device and belongs to a second account, and the data access operation is triggered by a first account logged in to the first device; the access authorization request is used to request a current device to negotiate with the storage device based on access authorization information to generate authorization verification information; and the access authorization information is an authorization result generated by the second account by performing access authorization on the data access operation;

obtaining the access authorization information;

negotiating with the storage device based on the access authorization information and the access authorization request to generate the authorization verification information; and sending the authorization verification information to the first device.

In a feasible implementation of the second aspect, the current device is a user terminal device to which the second account is logged in; and the access authorization request is further used to request the second account logged in to the current device to perform the access authorization.

In a feasible implementation of the second aspect, the obtaining the access authorization information includes:

outputting an access authorization interface to a user of the second account to obtain user authorization input, and generating the access authorization information based on the user authorization input; or generating the access authorization information based on an access permission setting for the user data in the second account.

In a feasible implementation of the second aspect, the obtaining the access authorization information includes:

receiving the access authorization information actively sent by a second device, where the second device is a user terminal device to which the second account is logged in.

In a feasible implementation of the second aspect, the obtaining the access authorization information includes:

generating a user authorization request based on the access authorization request, and sending the user authorization request to a second device, where the second device is a user terminal device to which the second account is logged in, and the user authorization request is used to request the second account logged in to the second device to perform the access authorization to generate the access authorization information; and obtaining the access authorization information fed back by the second device.

According to a third aspect, this application provides a data access authorization method, including:

obtaining a user authorization request, where the user authorization request is used to trigger access authorization for a data access operation, the data access operation is performed on user data stored on a storage device, the user data belongs to a second account, a current device is a user terminal device to which the second account is logged in, and the data access operation is triggered by a first account logged in to a first device;

when the access authorization is triggered, performing the access authorization based on the second account logged in to the current device, to generate access authorization information for the data access operation; and outputting the access authorization information to a second device, where the second device is configured to negotiate with the storage device based on the access authorization information to generate authorization verification information for the data access operation.

According to a fourth aspect, this application provides a data access response method, including:

receiving a first access request from a first device, where the first device is a user terminal device to which a first account is logged in, the first access request corresponds to a data access operation on user data, the data access operation is triggered by the first account logged in to the first device, and the user data is stored on a storage device and belongs to a second account;

generating a permission verification request based on the first access request, where the permission verification request is used to request to obtain authorization verification information for the data access operation from the first device;

sending the permission verification request to the first device;

based on access authorization information from a second device, negotiating with the second device to generate the authorization verification information, where the access authorization information is an authorization result generated by the second account by performing access authorization on the data access operation;

receiving a second access request from the first device, where the second access request is for the data access operation, and is an access request generated by the first device based on the authorization verification information; and performing permission verification on the second access request based on the authorization verification information, and when the permission verification succeeds, performing a data access response operation corresponding to the second access request.

According to a fifth aspect, this application provides a data access apparatus, including:

a first request generation module, configured to, when a first account logged in to a current device triggers a data access operation on user data, generate a first access request corresponding to the data access operation, where the user data is stored on a storage device and belongs to a second account;

a first output module, configured to send the first access request to the storage device;

a first request receiving module, configured to receive a permission verification request fed back by the storage device, where the permission verification request corresponds to the first access request, and the permission verification request is used to request to obtain authorization verification information for the data access operation from the current device;

a second request generation module, configured to generate an access authorization request based on the permission verification request, where the access authorization request is used to request a first device to negotiate with the storage device based on access authorization information to generate the authorization verification information, and the access authorization information is an authorization result generated by the second account by performing access authorization on the data access operation;

a second output module, configured to output the access authorization request to the first device;

a second request receiving module, configured to receive the authorization verification information from the first device;

a third request generation module, configured to generate, based on the authorization verification information, a second access request corresponding to the data access operation; and a third output module, configured to send the second access request to the storage device.

According to a sixth aspect, this application provides a data access authorization apparatus, including:

a first obtaining module, configured to obtain an access authorization request from a first device, where the access authorization request corresponds to a data access operation on user data, the user data is stored on a storage device and belongs to a second account, and the data access operation is triggered by a first account logged in to the first device; the access authorization request is used to request a current device to negotiate with the storage device based on access authorization information to generate authorization verification information; and the access authorization information is an authorization result generated by the second account by performing access authorization on the data access operation;

a second obtaining module, configured to obtain the access authorization information;

a request generation module, configured to negotiate with the storage device based on the access authorization information and the access authorization request to generate the authorization verification information; and an output module, configured to send the authorization verification information to the first device.

According to a seventh aspect, this application provides a data access authorization apparatus, including:

an obtaining module, configured to obtain a user authorization request, where the user authorization request is used to trigger access authorization for a data access operation, the data access operation is performed on user data stored on a storage device, the user data belongs to a second account, a current device is a user terminal device to which the second account is logged in, and the data access operation is triggered by a first account logged in to a first device;

an authorization module, configured to, when the access authorization is triggered, perform the access authorization based on the second account logged in to the current device, to generate access authorization information for the data access operation; and an output module, configured to output the access authorization information to a second device, where the second device is configured to negotiate with the storage device based on the access authorization information to generate authorization verification information for the data access operation.

According to an eighth aspect, this application provides a data access response apparatus, including:

a first request receiving module, configured to receive a first access request from a first device, where the first device is a user terminal device to which a first account is logged in, the first access request corresponds to a data access operation on user data, the data access operation is triggered by the first account logged in to the first device, and the user data is stored on a storage device and belongs to a second account;

a request generation module, configured to generate a permission verification request based on the first access request, where the permission verification request is used to request to obtain authorization verification information for the data access operation from the first device;

an output module, configured to send the permission verification request to the first device;

a negotiation module, configured to negotiate with a second device based on access authorization information from the second device to generate the authorization verification information, where the access authorization information is an authorization result generated by the second account by performing access authorization on the data access operation;

a second request receiving module, configured to receive a second access request from the first device, where the second access request is for the data access operation, and is an access request generated by the first device based on the authorization verification information; and an access response module, configured to perform permission verification on the second access request based on the authorization verification information, and when the permission verification succeeds, perform a data access response operation corresponding to the second access request.

According to a ninth aspect, this application further provides an electronic device. The electronic device includes a memory configured to store computer program instructions and a processor configured to execute the program instructions, and when the computer program instructions are executed by the processor, the electronic device is triggered to perform the method steps described in embodiments of this application.

According to a tenth aspect, this application further provides a computer-readable storage medium. The computer-readable storage medium stores a computer program, and when the computer program is run on a computer, the computer is enabled to perform the method in embodiments of this application.

According to the foregoing technical solutions provided in embodiments of this application, at least the following technical effects can be achieved:

According to the methods in embodiments of this application, when an unauthorized user intends to access user data, access authorization may be performed on a current access behavior of the unauthorized user, to implement data sharing between different users while ensuring data security. According to the methods in embodiments of this application, application scenarios of cloud storage can be greatly expanded, and user experience of the cloud storage can be improved.

DESCRIPTION OF EMBODIMENTS

To make objectives, technical solutions, and advantages of this application clearer, the following clearly and completely describes the technical solutions in this application with reference to specific embodiments and corresponding accompanying drawings in this application. It is clear that the described embodiments are merely some but not all of embodiments of this application. All other embodiments obtained by a person of ordinary skill in the art based on embodiments of this application without creative efforts shall fall within the protection scope of this application.

Some terms used in implementations of this application are only used to explain specific embodiments of this application, but are not intended to limit this application.

To resolve a security problem of accessing data on a storage device in a network in a current technology, a feasible solution is to set independent access permission and restrict the storage device to be accessed only by a specific user account. For example, a router storage allows only access of an application (Application, APP) of a user account (this account) bound to the router storage, or full-disk access on a computer according to a server message block (Server Message Block, SMB) protocol (for example, by using a Samba service).

Figure 1:
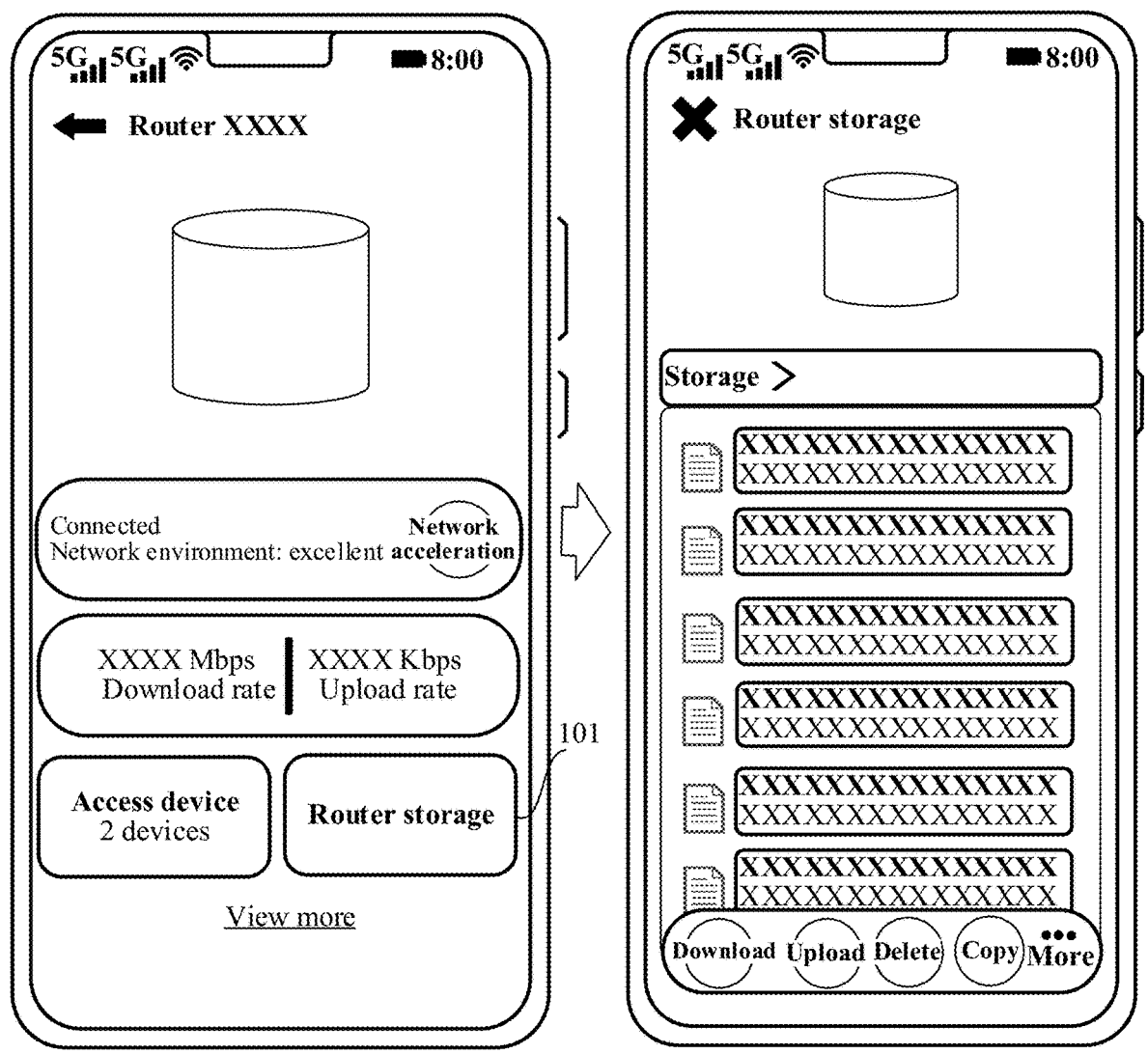
FIG. 1 is a schematic diagram of an access interface for a mobile phone to access a storage device.

FIG. 1 is a schematic diagram of an access interface for a mobile phone to access a storage device. A same user account is logged in to the mobile phone and a router. The storage device is disposed inside in the router, and can be remotely accessed by a user account logged in to the router. When the mobile phone is connected to the router, a display interface shown in a left figure in FIG. 1 may be opened on the mobile phone. A router storage (101) is clicked to enter a display interface shown in a right figure in FIG. 1, and files stored on the storage device disposed inside the router are accessed.

In the embodiment shown in FIG. 1, unauthorized access may be prevented by restricting an access account of the storage device. However, because the storage device can be accessed only by a single account, the storage device cannot be used under a plurality of accounts. The storage device can be shared only between a plurality of devices under a same user account, but cannot be shared between a plurality of user accounts. This greatly weakens a sharing attribute of the storage device.

To improve a sharing capability of the storage device and expand application scenarios of the storage device, a feasible solution is to allow a plurality of different user accounts to be logged in to the storage device, and set independent file directories for different users. Different users cannot view each other's data. A user can deploy an independent Samba service to access all files of the user on a computer.

Figure 2:
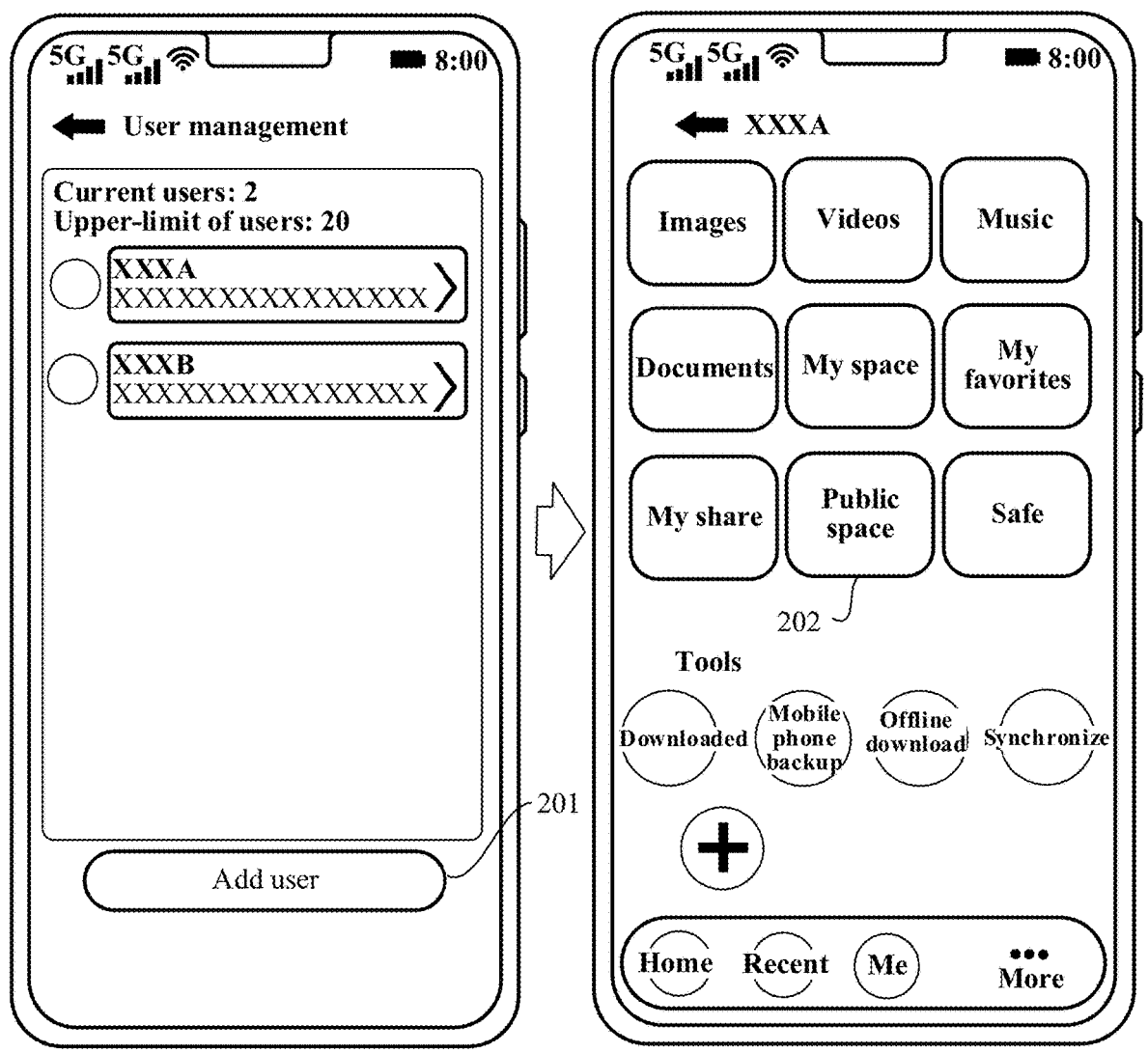
FIG. 2 is a schematic diagram of an access interface for a mobile phone to access a storage device.

FIG. 2 is a schematic diagram of an access interface for a mobile phone to access a storage device. The mobile phone is connected to the storage device through a user account with management permission, to enter a user management interface. As shown in a left figure in FIG. 2, all current user accounts (a user account XXXA and a user account XXXB) allowed to access the storage device are presented on the user management interface. A user account is clicked to enter a user account setting page, to manage the user account, for example, to set an available capacity for the user account on the storage device and delete the user account. Further, a user account that can access the storage device may alternatively be added by clicking a button 201 of adding a user.

The mobile phone is connected to the storage device through a user account (for example, the user account XXXA or the user account XXXB) with access permission. For example, the user account "XXXA" is clicked to enter a page shown in a right figure in FIG. 2. The user can access files that are of the user account XXXA and that are stored on the storage device in a manner of accessing local files on the mobile phone.

In the embodiment shown in FIG. 2, independent file directories are set for different users to support multi-account use and ensure data access security. However, because different users cannot view each other's data, data sharing between different user accounts cannot be performed, and a data sharing function of the storage device still cannot meet user requirements. To implement file sharing between different user accounts, in the embodiment shown in FIG. 2, a "public space" (202) is set on the storage device. Files stored in the public space can be accessed by all user accounts with access permission to the storage device.

By setting the public space, the storage device can implement data sharing between different user accounts. However, in this technology, when files are shared in a personal directory, all personal data can be shared by using a Samba service only. This usage process is complex and it is difficult to manage permission. In addition, because the public space is open to all the user accounts with the access permission to the storage device, directional sharing cannot be implemented during data sharing. For example, a user account A, a user account B, and a user account C are all user accounts that can access a storage device D. A user of the user account A stores a video file X in a public space of the storage device D, and both the user account B and the user account C may obtain the video file X by accessing the public space of the storage device D. However, if the user account A expects to share the video file X with the user account B only, and does not expect the user account C to obtain the video file X, the expectation of the user account A cannot be achieved according to this sharing solution based on the public space.

For the foregoing problem, in an embodiment of this application, a data access method based on user individual authorization is provided. Specifically, assuming that the user account A is one of the user accounts logged in to the storage device, when the user account B (which may be one of the user accounts logged in to the storage device, or may be a user account not logged in to the storage device) expects to access data of the user account A on the storage device, the user account B requests independent authorization from the user account A. The user account A can perform the independent authorization on an access behavior of the user account B. The authorization performed by the user account A on the user account B is only for the current access behavior of the user account B, and access permission of another user is not affected. For example, after the user account A performs the authorization on the user account B, and allows the user account B to access the video file X, the user account C does not obtain the authorization synchronously.

Figure 3:
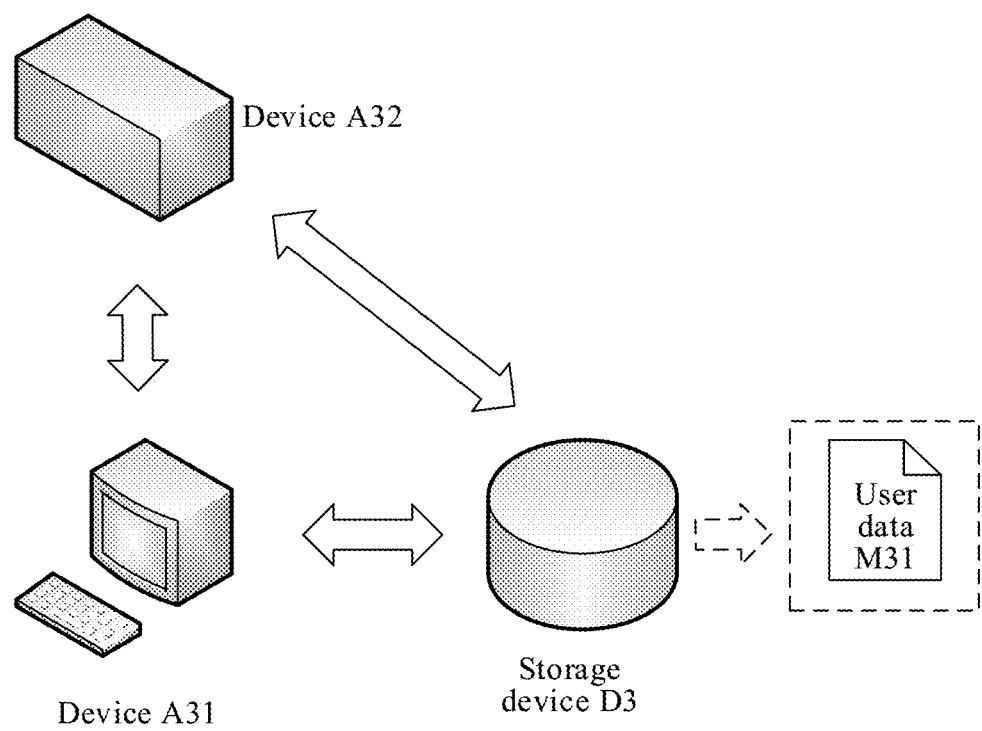
FIG. 3 is a schematic diagram of an application scenario according to an embodiment of this application.

Specifically, FIG. 3 is a schematic diagram of an application scenario according to an embodiment of this application. As shown in FIG. 3, user data M31 is stored on a storage device D3 and belongs to an account Y32 (the user data M31 is data stored on the storage device D3 by the account Y32, and access permission for the user data M31 belongs to the account Y32). A device A31 is a terminal device connected to the storage device D3, and can initiate a data access operation on the user data stored on the storage device D3. An account Y31 is logged in to the device A31. Because the account Y31 and the account Y32 are different user accounts, the account Y31 logged in to the device A31 does not have the access permission for the user data M31. To access, on the device A31 to which the account Y31 is logged in, the user data M31 stored on the storage device D3, according to the method in this embodiment of this application, the account Y32 performs access authorization on the data access operation of the account Y31, a device A32 negotiates with the storage device D3 based on the access authorization of the account Y32 to generate authorization verification information, the device A32 sends the authorization verification information to the device A31, the device A31 initiates the data access operation based on the authorization verification information, and the storage device D3 verifies the data access operation by verifying the authorization verification information, to open the user data M31 to the account Y31.

According to the methods in embodiments of this application, when an unauthorized user intends to access user data, access authorization may be performed on a current access behavior of the unauthorized user, to implement data sharing between different users while ensuring data security. According to the methods in embodiments of this application, application scenarios of cloud storage can be greatly expanded, and user experience of the cloud storage can be improved.

Figure 4:
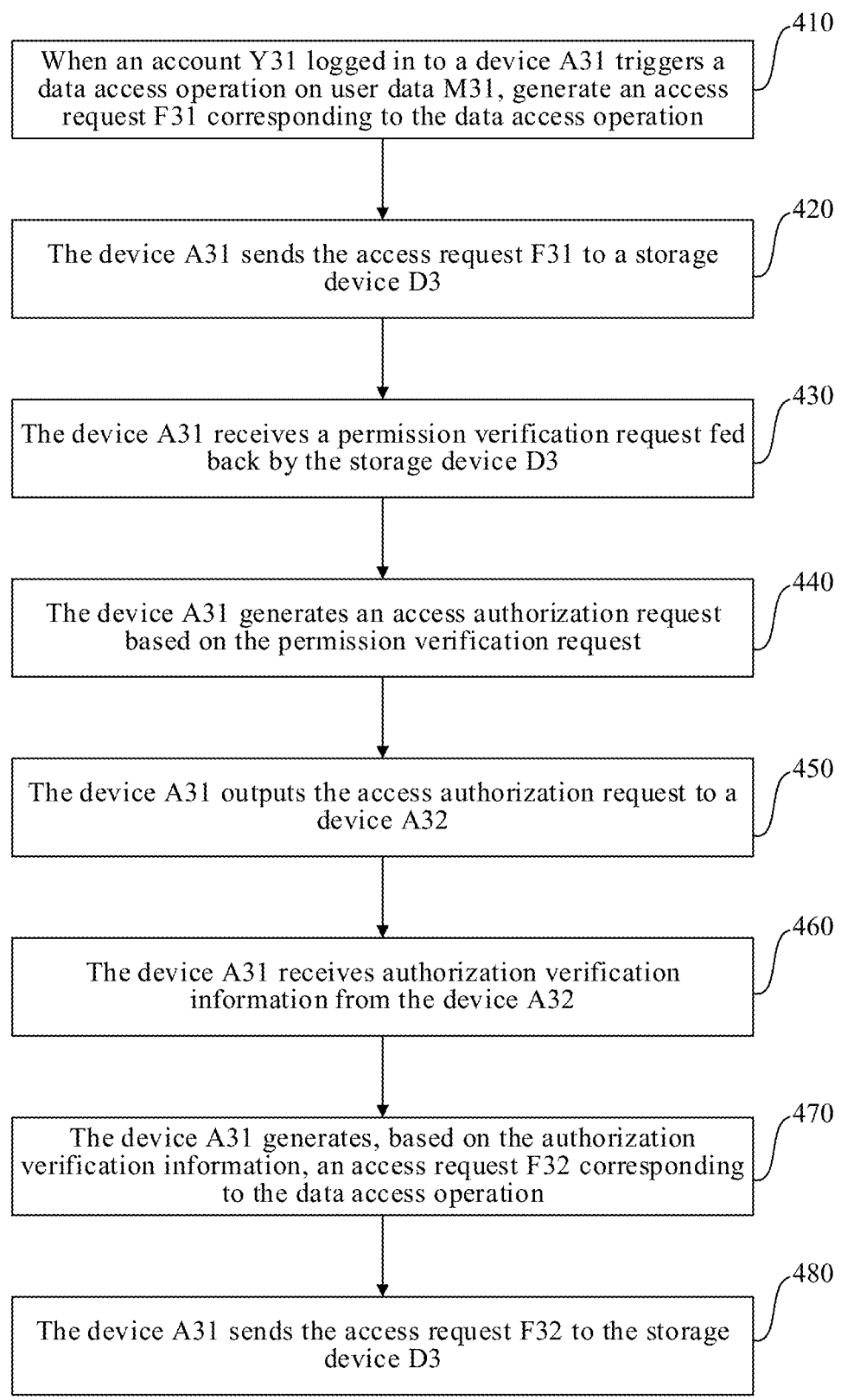
FIG. 4 is a flowchart of a data access method according to an embodiment of this application.

Specifically, an embodiment of this application provides a data access method. The method is performed by a data access initiator device (for example, a mobile phone, a smart band, a tablet computer, a smart television, a smart screen, a notebook computer, a desktop computer, or a network server). FIG. 4 is a flowchart of the data access method according to an embodiment of this application. A device A31 (the data access initiator device) performs the following procedure shown in FIG. 4 to implement data access to user data M31 on a storage device D3.

Step 410: When an account Y31 logged in to the device A31 triggers a data access operation on the user data M31, generate an access request F31 corresponding to the data access operation, where the user data M31 is stored on the storage device D3 and belongs to an account Y32.

Step 420: The device A31 sends the access request F31 to the storage device D3.

Step 430: The device A31 receives a permission verification request fed back by the storage device D3, where the permission verification request corresponds to the access request F31, and is used to request to obtain authorization verification information for the data access operation from the device A31.

Step 440: The device A31 generates an access authorization request based on the permission verification request, where the access authorization request is used to request a device A32 to negotiate with the storage device D3 based on access authorization information to generate the authorization verification information. The access authorization information is an authorization result generated by the account Y32 by performing access authorization on the data access operation. For example, the device A31 generates the access authorization request based on an account ID of the account Y31, a device ID of the device A31, an account ID of the account Y32 to which the user data M31 belongs, and a device ID of the storage device D3.

Step 450: The device A31 outputs the access authorization request to the device A32.

Step 460: The device A31 receives the authorization verification information from the device A32.

Step 470: The device A31 generates, based on the authorization verification information, an access request F32 corresponding to the data access operation.

Step 480: The device A31 sends the access request F32 to the storage device D3.

Figure 5:
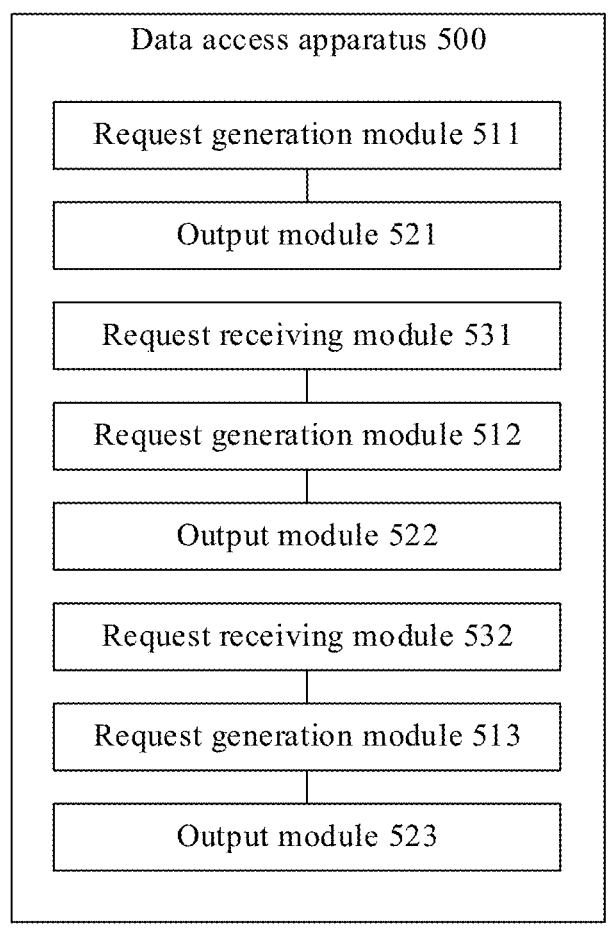
FIG. 5 is a structural block diagram of a data access apparatus according to an embodiment of this application.

Further, based on the method in the embodiment shown in FIG. 4, an embodiment of this application further provides a data access apparatus. The apparatus is constructed in a data access initiator device. FIG. 5 is a structural block diagram of the data access apparatus according to an embodiment of this application. The data access apparatus 500 is constructed in a device A31. As shown in FIG. 5, the data access apparatus 500 includes:

a request generation module 511, configured to, when an account Y31 logged in to the device A31 triggers a data access operation on user data M31, generate an access request F31 corresponding to the data access operation, where the user data M31 is stored on a storage device D3 and belongs to an account Y32;

an output module 521, configured to send a first access request to the storage device D3;

a request receiving module 531, configured to receive a permission verification request fed back by the storage device D3, where the permission verification request corresponds to the first access request, and is used to request to obtain authorization verification information for the data access operation from the device A31;

a request generation module 512, configured to generate an access authorization request based on the permission verification request, where the access authorization request is used to request a device A32 to negotiate with the storage device D3 based on access authorization information to generate the authorization verification information, and the access authorization information is an authorization result generated by the account Y32 by performing access authorization on the data access operation;

an output module 522, configured to output the access authorization request to the device A32;

a request receiving module 532, configured to receive the authorization verification information from the device A32;

a request generation module 513, configured to generate, based on the authorization verification information, a second access request corresponding to the data access operation; and an output module 523, configured to send the second access request to the storage device D3.

Figure 6:
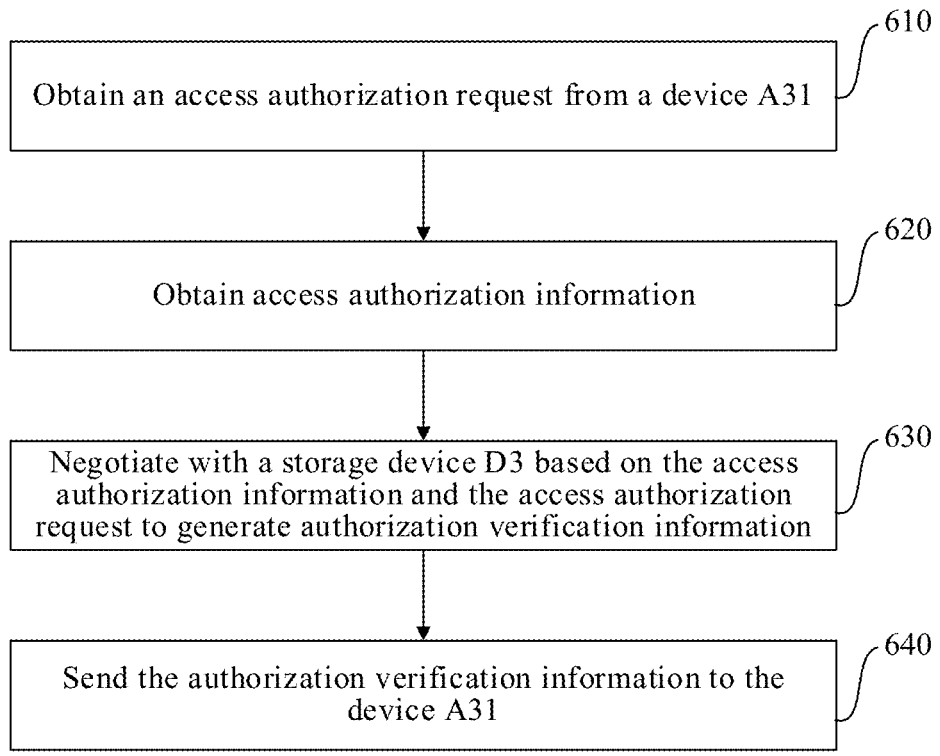
FIG. 6 is a flowchart of a data access authorization method according to an embodiment of this application.

Further, in steps 440, 450, and 460, the device A31 generates the access authorization request based on the permission verification request, outputs the access authorization request to the device A32, and receives the authorization verification information from the device A32. To implement steps 440, 450, and 460, an embodiment of this application further provides a data access authorization method. The method is performed by a device (for example, a mobile phone, a smart band, a tablet computer, a smart television, a smart screen, a notebook computer, a desktop computer, or a network server) that feeds back the authorization verification information to the data access initiator device. FIG. 6 is a flowchart of the data access authorization method according to an embodiment of this application. As shown in FIG. 6, a device A32 performs the following procedure to feed back authorization verification information to a device A31.

Step 610: Obtain an access authorization request from the device A31, where the access authorization request corresponds to a data access operation on user data M31, the user data M31 is stored on a storage device D3 and belongs to an account Y32, and the data access operation is triggered by an account Y31 logged in to the device A31. The access authorization request is used to request a current device (the device A32) to negotiate with the storage device D3 based on access authorization information to generate the authorization verification information. The access authorization information is an authorization result generated by the account Y32 by performing access authorization on the data access operation. Further, the access authorization information includes an authorized directory, an authorized access account ID, a device ID, a validity period, and the like.

Step 620: Obtain the access authorization information.

Step 630: Negotiate with the storage device D3 based on the access authorization information and the access authorization request to generate the authorization verification information. For example, the device A32 negotiates with the storage device D3 based on a trust circle (Single Sign On, SSO) to generate authorization information, where the authorization information includes an authorized directory, an authorized access account ID, a device ID, a validity period, and the like; and generates an authorization token (token).

Step 640: Send the authorization verification information to the device A31. For example, the device A32 sends the authorization token to the device A31 based on the SSO.

Figure 7:
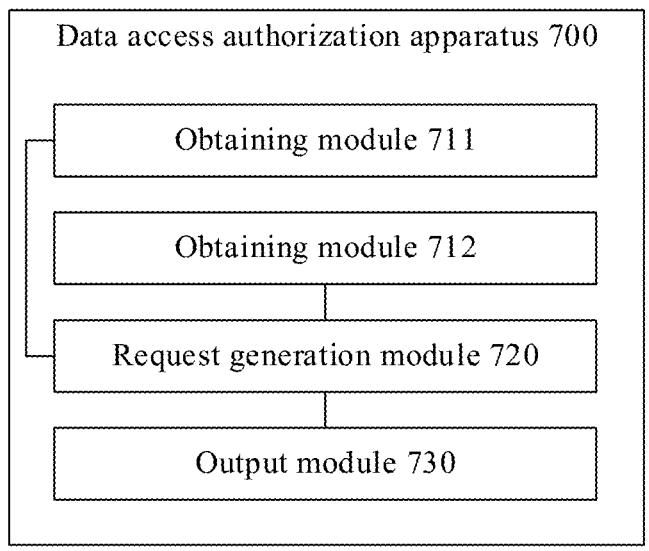
FIG. 7 is a structural block diagram of a data access authorization apparatus according to an embodiment of this application.

Further, based on the method in the embodiment shown in FIG. 6, an embodiment of this application further provides a data access authorization apparatus. The apparatus is constructed in a device that feeds back the authorization verification information to the data access initiator device. FIG. 7 is a structural block diagram of the data access authorization apparatus according to an embodiment of this application. The data access authorization apparatus 700 is constructed in a device A32. As shown in FIG. 7, the data access authorization apparatus 700 includes:

an obtaining module 711, configured to obtain an access authorization request from a device A31;

an obtaining module 712, configured to obtain access authorization information;

a request generation module 720, configured to negotiate with a storage device D3 based on the access authorization information and the access authorization request to generate authorization verification information; and an output module 730, configured to send the authorization verification information to the device A31.

Figure 8:
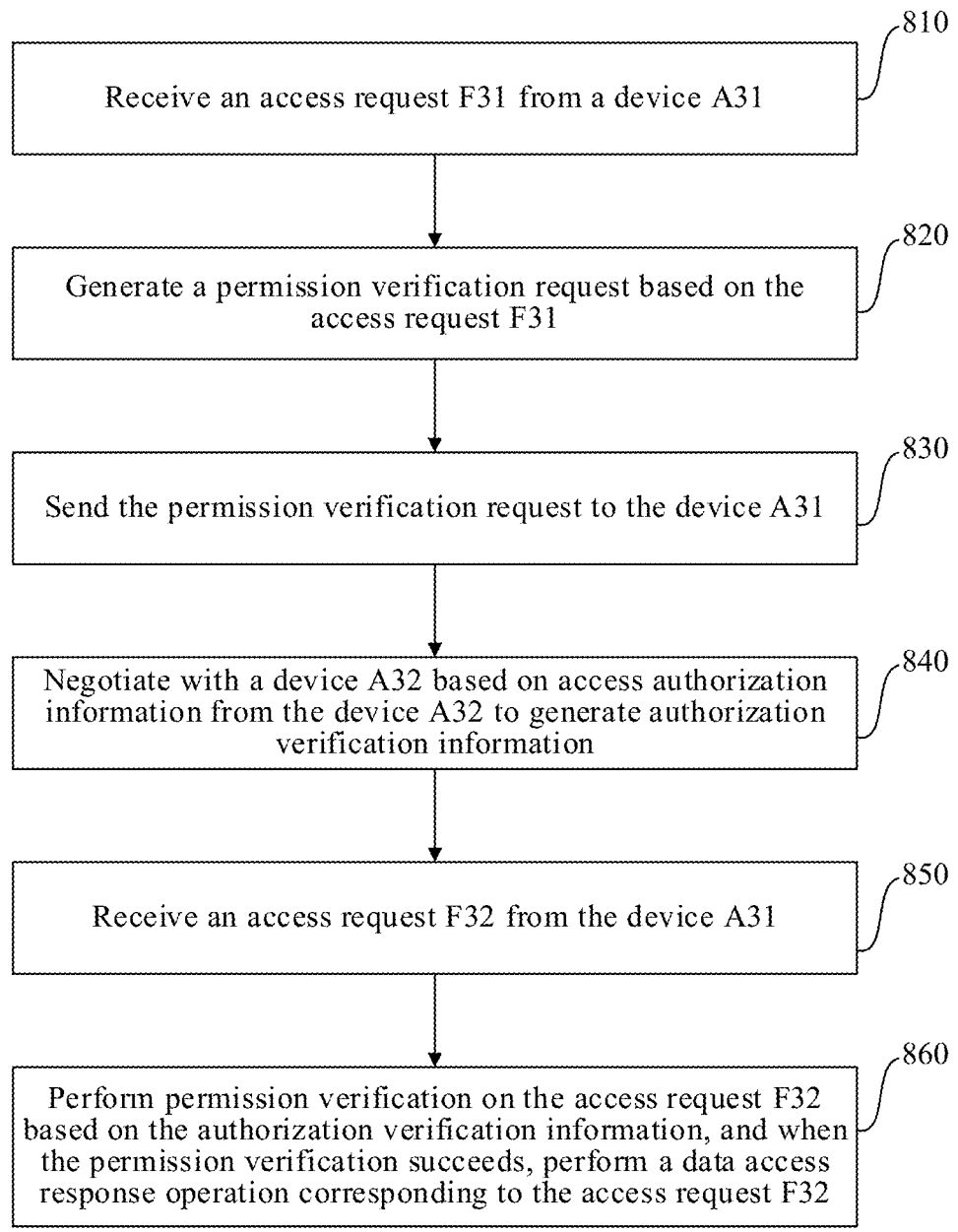
FIG. 8 is a flowchart of a data access response method according to an embodiment of this application.

Further, in steps 420, 430, and 480, the device A31 sends an access request F31 to the storage device D3, receives a permission verification request fed back by the storage device D3, and sends an access request F32 to the storage device D3; and in step 630, the device A32 negotiates with the storage device D3 to generate the authorization verification information. To implement steps 420, 430, 480, and 630, an embodiment of this application further provides a data access response method. The method is performed by a storage device (for example, an independent storage device (for example, a removable hard disk), a network cloud storage server, a terminal device (for example, a notebook computer, a tablet computer, a mobile phone, or a desktop computer) that enables a storage sharing function, and a router that can implement network storage) that stores user data. FIG. 8 is a flowchart of the data access response method according to an embodiment of this application. As shown in FIG. 8, a storage device D3 performs the following procedure to respond to data access of a device A31.

Step 810: Receive an access request F31 from the device A31, where the device A31 is a user terminal device to which an account Y31 is logged in, the access request F31 corresponds to a data access operation on user data, the data access operation is triggered by the account Y31 logged in to the device A31, and the user data is stored on the storage device D3 and belongs to an account Y32.

Step 820: Generate a permission verification request based on the access request F31, where the permission verification request is used to request to obtain authorization verification information for the data access operation from the device A31.

Step 830: Send the permission verification request to the device A31.

Step 840: Negotiate with a device A32 based on access authorization information from the device A32 to generate the authorization verification information, where the access authorization information is an authorization result generated by the account Y32 by performing access authorization on the data access operation.

Step 850: Receive an access request F32 from the device A31, where the access request F32 is for the data access operation, and the access request F32 is an access request generated by the device A31 based on the authorization verification information.

Step 860: Perform permission verification on the access request F32 based on the authorization verification information (for example, extract authorization verification information from the access request F32, and verify whether the extracted authorization verification information matches the authorization verification information stored on the storage device D3), and when the permission verification succeeds, perform a data access response operation corresponding to the access request F32.

Figure 9:
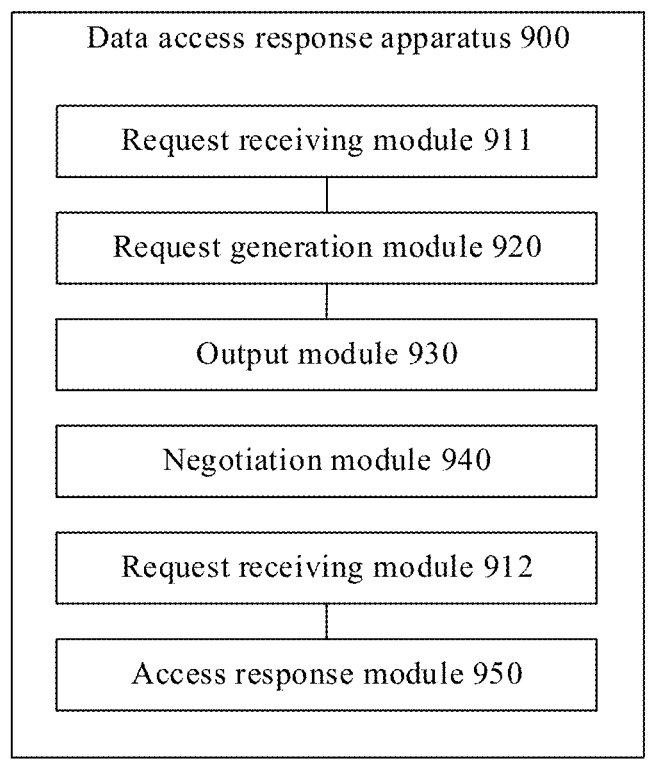
FIG. 9 is a structural block diagram of a data access response apparatus according to an embodiment of this application.

Further, based on the method in the embodiment shown in FIG. 8, an embodiment of this application further provides a data access response apparatus. The apparatus is constructed in the storage device that stores user data. FIG. 9 is a structural block diagram of the data access response apparatus according to an embodiment of this application. The data access response apparatus 900 is constructed in the storage device D3. As shown in FIG. 9, the data access response apparatus 900 includes:

a request receiving module 911, configured to receive an access request F31 from a device A31;

a request generation module 920, configured to generate a permission verification request based on the access request F31;

an output module 930, configured to send a permission verification request to the device A31;

a negotiation module 940, configured to negotiate with a device A32 based on access authorization information from the device A32 to generate authorization verification information;

a request receiving module 912, configured to receive an access request F32 from the device A31; and an access response module 950, configured to perform permission verification on the access request F32 based on the authorization verification information, and when the permission verification succeeds, perform a data access response operation corresponding to the access request F32.

Further, in an embodiment of this application, to simplify an authorization process, a single device is configured to complete the access authorization and negotiation of the authorization verification information. Specifically, the device A32 is a user terminal device (for example, a mobile phone) to which an account Y32 is logged in. The access authorization request sent by the device A31 to the device A32 is further used to request the account Y32 logged in to the device A32 to perform the access authorization. The device A32 performs access authorization on the data access operation. After generating the access authorization information, the device A32 negotiates with the storage device D3 to generate the authorization verification information.

Figure 10A:
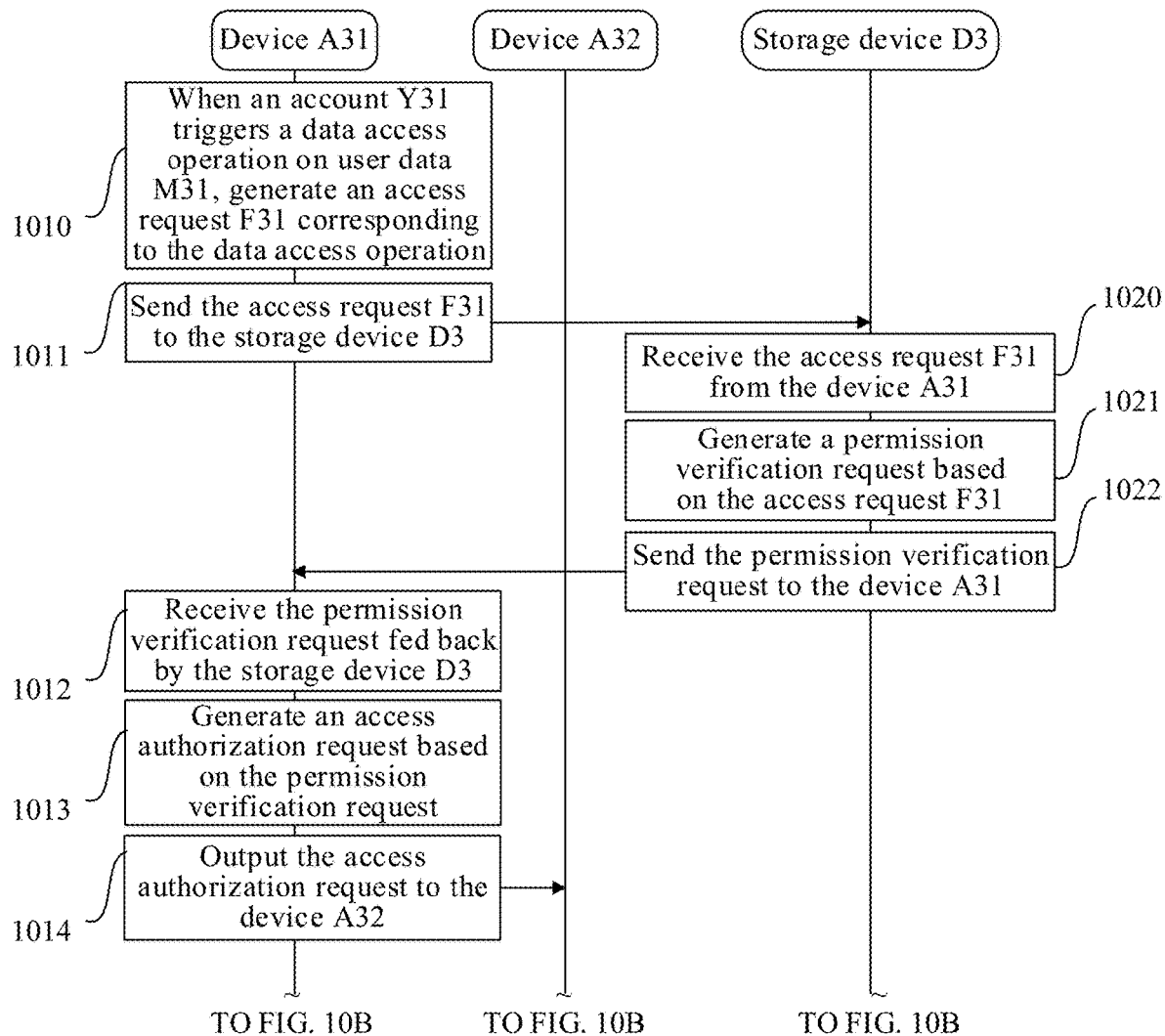
FIG. 10A and FIG. 10B are a timing diagram of data access according to an embodiment of this application.
Figure 10B:
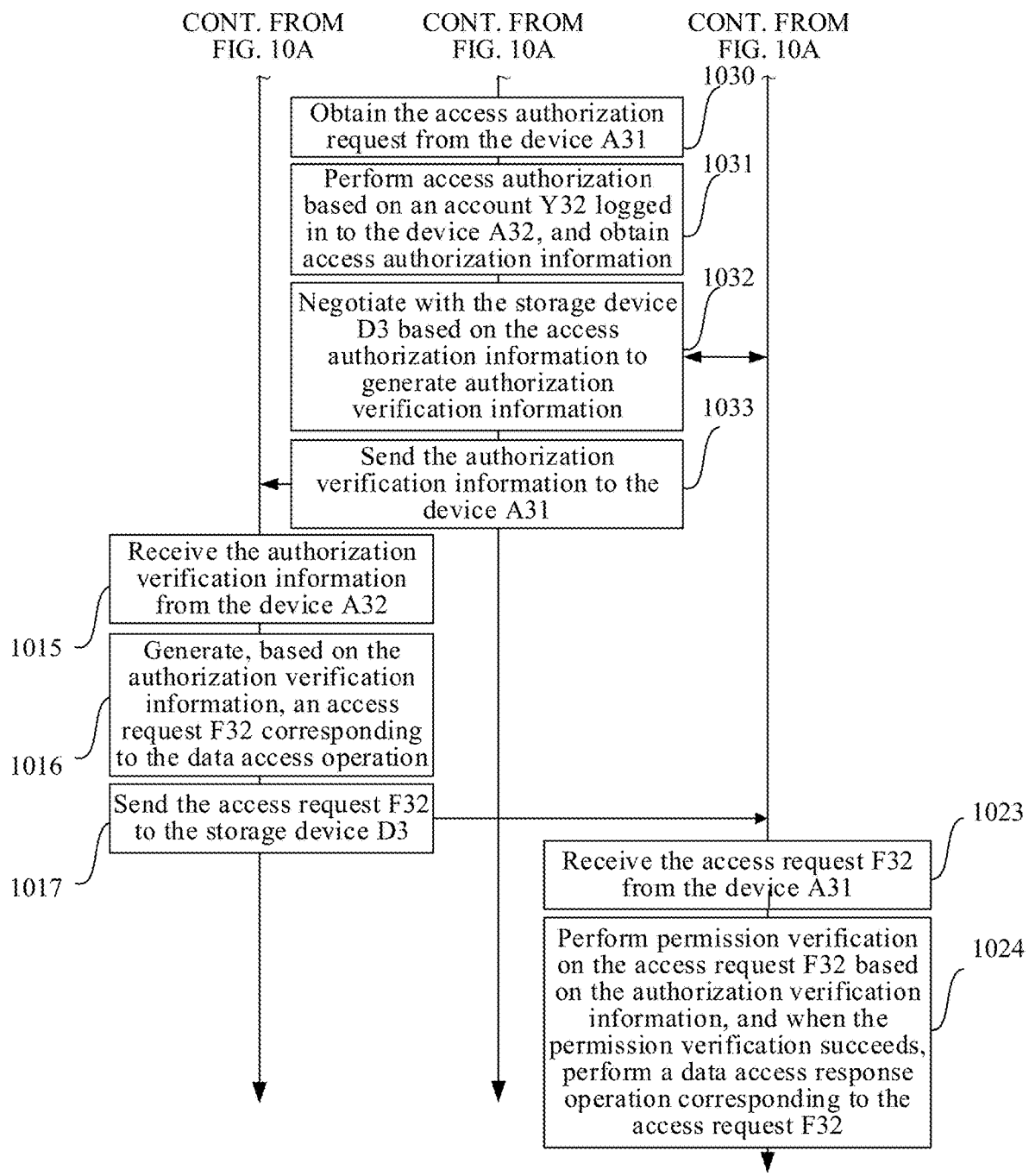

FIG. 10A and FIG. 10B are a timing diagram of data access according to an embodiment of this application. As shown in FIG. 10A and FIG. 10B, the following steps are included:

Step 1010: When an account Y31 logged in to a device A31 triggers a data access operation on user data M31, the device A31 generates an access request F31 corresponding to the data access operation.

Step 1011: The device A31 sends the access request F31 to the storage device D3.

Step 1020: The storage device D3 receives the access request F31 from the device A31.

Step 1021: The storage device D3 generates a permission verification request based on the access request F31.

Step 1022: The storage device D3 sends the permission verification request to the device A31.

Step 1012: The device A31 receives the permission verification request fed back by the storage device D3.

Step 1013: The device A31 generates an access authorization request based on the permission verification request.

Step 1014: The device A31 outputs the access authorization request to the device A32.

Step 1030: The device A32 obtains the access authorization request from the device A31.

Step 1031: The device A32 performs access authorization based on an account Y32 logged in to the device A32, and obtains access authorization information.

Step 1032: The device A32 negotiates with the storage device D3 based on the access authorization information to generate authorization verification information.

Step 1033: The device A32 sends the authorization verification information to the device A31.

Step 1015: The device A31 receives the authorization verification information from the device A32.

Step 1016: The device A31 generates, based on the authorization verification information, an access request F32 corresponding to the data access operation.

Step 1017: The device A31 sends the access request F32 to the storage device D3.

Step 1023: Receive the access request F32 from the device A31.

Step 1024: Perform permission verification on the access request F32 based on the authorization verification information, and when the permission verification succeeds, perform a data access response operation corresponding to the access request F32.

In an actual application scenario, the steps in the foregoing method procedure may be implemented in a plurality of different implementations.

Specifically, in an implementation of step 1013, the access authorization request is in a form of a two-dimensional code. Specifically, the access authorization request is two-dimensional code data. In an implementation of step 1014, the device A31 presents, to the device A32, the two-dimensional code corresponding to the two-dimensional code data. In an implementation of step 1030, the device A32 obtains the access authorization request by scanning and parsing the two-dimensional code.

Specifically, in an implementation of step 1031, the access authorization is performed in a manner of user authorization. Specifically, the device A32 outputs an access authorization interface to a user of the account Y32 to obtain user authorization input, and generates the access authorization information based on the user authorization input. For example, the device A32 pops up an authorization request box in a current display interface, to request the current user of the device A32 to perform an authorization operation.

Further, in an implementation of step 1031, a user can perform detailed access authorization. For example, the user may set an access rule, where the access rule includes information such as an access directory, access time, an access device ID, and an access device account.

Figure 11:
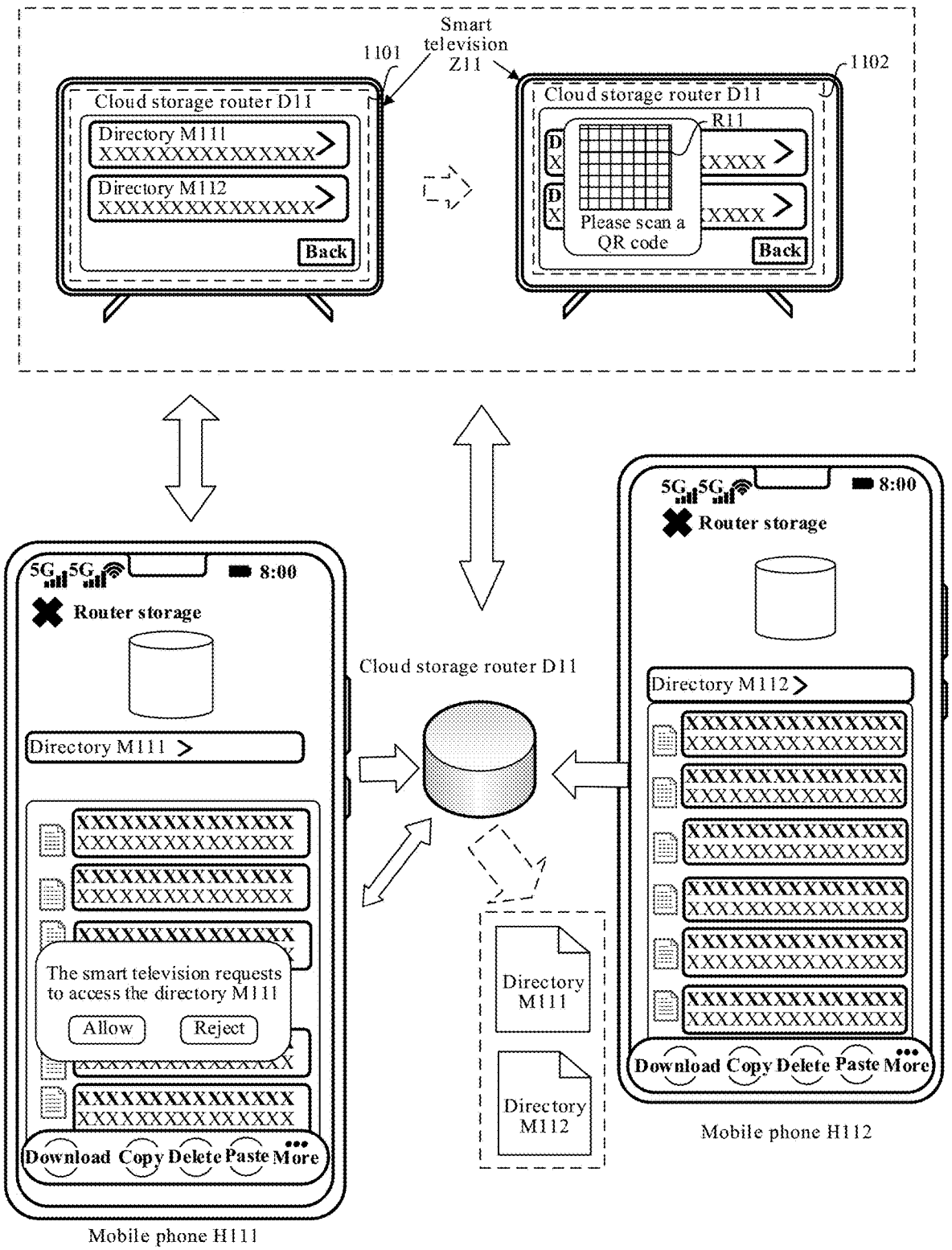
FIG. 11 is a schematic diagram of an application scenario according to an embodiment of this application.

FIG. 11 is a schematic diagram of an application scenario according to an embodiment of this application. As shown in FIG. 11, a cloud storage router D11 is connected to a home network. A family member M111 uses an own mobile phone H111 (a user account Y111 that is of the family member M111 and that is logged in to the mobile phone H111) to connect to the home network, and stores data in a directory M111 in the cloud storage router D11. A family member M112 uses an own mobile phone H112 (a user account Y112 that is of the family member M112 and that is logged in to the mobile phone H112) to connect to the home network, and stores data in a directory M112 in the cloud storage router D11.

A smart television Z11 is a public device in the home network. The user account Y111 of the family member M111 or the user account Y112 of the family member M112 may be logged in to the smart television Z11. Alternatively, the smart television Z11 is in a non-login state (where in this case, it is considered that a public account Y113 is logged in to the smart television Z11).

When a family member (which may be the family member M111, the family member M112, or another user other than the family members M111 and M112) uses the smart television Z11 (in the non-login state) to access the directory M111 under the user account Y111 in the cloud storage router D11 (as shown in an interface 1101 in FIG. 11, a user clicks the directory M111 in the cloud storage router D11), the smart television Z11 generates an access request F111, and sends the access request F111 to the cloud storage router D11.

Because the access request F111 corresponds to the public account Y113, but the public account Y113 does not have access permission for the directory M111, the cloud storage router D11 feeds back a permission verification request to the smart television Z11. The smart television Z11 generates an access authorization request two-dimensional code R11 based on the permission verification request fed back by the cloud storage router D11, and presents the access authorization request two-dimensional code R11 (as shown in an interface 1102 in FIG. 11).

The family member M111 uses the mobile phone H111 to scan the access authorization request two-dimensional code R11 presented on the smart television Z11, and the mobile phone H111 parses the two-dimensional code to obtain an access authorization request. Based on the access authorization request, the mobile phone H111 pops up a request authorization button on a display interface, to request the user M111 to perform an access authorization operation (to request the user to click an "Allow" button or a "Reject" button). After the user M111 clicks the "Allow" button, authorization is completed, and the mobile phone H111 generates access authorization information.

The mobile phone H111 sends the access authorization information to the cloud storage router D11, and negotiates with the cloud storage router D11 based on the access authorization information to generate authorization verification information.

The mobile phone H111 sends the authorization verification information to the smart television Z11. The smart television Z11 generates an access request F112 based on the authorization verification information, and sends the access request F112 to the cloud storage router D11.

The cloud storage router D11 verifies the access request F112 based on the authorization verification information, and after the verification succeeds, opens the access permission for the directory M111 to the smart television Z11.

Further, when the family member M111 uses the smart television Z11 (the account Y111 logged in) to access the directory M112 under the user account Y112 in the cloud storage router D11, or the family member M112 uses the smart television Z11 (the account Y112 logged in) to access the directory M111 under the user account Y111 in the cloud storage router D11, or the family member M111 uses the mobile phone H111 to access the directory M112 under the user account Y112 in the cloud storage router D11, or the family member M112 uses the mobile phone H112 to access the directory M111 under the user account Y111 in the cloud storage router D11, data access may be performed through steps similar to the foregoing steps.

Further, in the embodiment shown in FIG. 11, when performing the access authorization operation, the user M111 only performs a simple operation of accepting the authorization (clicking the "Allow" button) or rejecting the authorization (clicking the "Reject" button). In another embodiment of this application, when performing the access authorization operation, the user M111 may perform a detailed authorization operation. For example, the user M111 authorizes the cloud storage router D11 to open a specific subdirectory or a specific file under the directory M111. For another example, the user M111 may further set an access permission validity period.

Further, in an implementation of step 1031, the access authorization may alternatively be performed in a manner of default authorization. Specifically, a device A32 generates access authorization information based on an access permission setting for user data in an account Y32. For example, in the account Y32, a setting of "allowing an account Y31 to access user data M31" is preset. In this case, when receiving an access authorization request, the device A32 may directly generate the access authorization information based on the setting of "allowing an account Y31 to access user data M31" in the account Y32.

Further, in an embodiment of this application, to improve authorization security, different devices are configured to complete the access authorization and negotiation of the authorization verification information. Specifically, a device A33 is a user terminal device (for example, a mobile phone) to which the account Y32 is logged in, and the device A32 is a device (for example, a network server) different from the device A33. After performing access authorization on a data access operation to generate access authorization information, the device A33 sends the access authorization information to the device A32, and the device A32 negotiates with a storage device D3 based on the access authorization information from the device A33 to generate authorization verification information.

Figure 12:
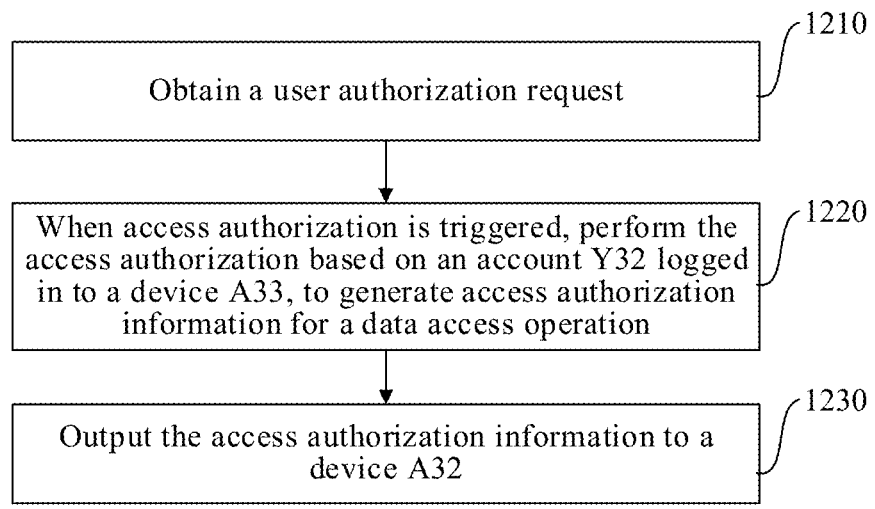
FIG. 12 is a flowchart of a data access authorization method according to an embodiment of this application.

Specifically, an embodiment of this application provides a data access authorization method. The method is performed by a device (for example, a mobile phone, a smart band, a tablet computer, a smart television, a smart screen, a notebook computer, a desktop computer, or a network server) to which an account with access authorization permission is logged in. FIG. 12 is a flowchart of the data access authorization method according to an embodiment of this application. A device A33 performs the following procedure shown in FIG. 12 to generate access authorization information.

Step 1210: Obtain a user authorization request, where the user authorization request is used to trigger access authorization for a data access operation, the data access operation is performed on user data M31 stored on a storage device D3, the user data M31 belongs to an account Y32, a current device (the device A33) is a user terminal device to which the account Y32 is logged in, and the data access operation is triggered by an account Y31 logged in to a device A31.

Step 1220: When the access authorization is triggered, perform the access authorization based on the account Y32 logged in to the device A33, to generate the access authorization information for the data access operation.

Step 1230: Output the access authorization information to a device A32, where the device A32 is configured to negotiate with the storage device D3 based on the access authorization information to generate authorization verification information for the data access operation.

Figure 13:
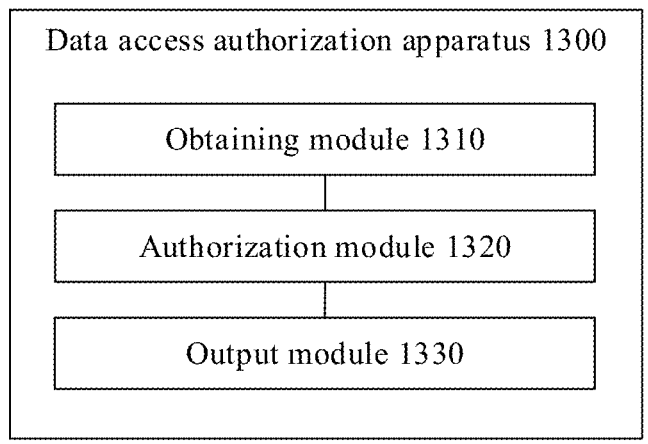
FIG. 13 is a structural block diagram of a data access authorization apparatus according to an embodiment of this application.

Further, based on the method in the embodiment shown in FIG. 12, an embodiment of this application further provides a data access authorization apparatus. The apparatus is constructed in a device to which an account with access authorization permission is logged in. FIG. 13 is a structural block diagram of the data access authorization apparatus according to an embodiment of this application. The data access authorization apparatus 1300 is constructed in a device A33. As shown in FIG. 13, the data access apparatus 1300 includes:

an obtaining module 1310, configured to obtain a user authorization request;

an authorization module 1320, configured to, when access authorization is triggered, perform the access authorization based on an account Y32 logged in to the device A33, to generate access authorization information for a data access operation; and an output module 1330, configured to output the access authorization information to a device A32.

According to the method in this embodiment of this application, the access authorization information is generated by the device A33, authorization verification information is generated by the device A32 by negotiating with the storage device D3, and the generation of the access authorization information and the generation of the authorization verification information are separated on two different devices. In this way, security of the access authorization is greatly improved.

Further, the device A32 may further compare an access authorization request sent by a device A31 with the access authorization information sent by the device A33. If the access authorization request matches the access authorization information, the device A32 negotiates with the storage device D3 to generate the authorization verification information. If the access authorization request does not match the access authorization information, the device A32 rejects the generation of the authorization verification information. In this way, the security of the access authorization can be further improved.

Specifically, in an embodiment of this application, an access authorization operation of the device A33 is triggered by the device A32. To be specific, the access authorization request sent by the device A31 to the device A32 is further used to request the device A32 to initiate a request authorization operation to the device A33, where the request authorization operation is used to request the account Y32 logged in to the device A33 to perform the access authorization. In an implementation of step 1210, the user authorization request is from the device A32.

In an implementation of step 620, the device A32 generates the user authorization request based on the access authorization request, and sends the user authorization request to the device A33, where the user authorization request is used to request the account Y32 logged in to the device A33 to perform the access authorization, to generate the access authorization information.

The device A32 obtains the access authorization information fed back by the device A33.

Figure 14A:
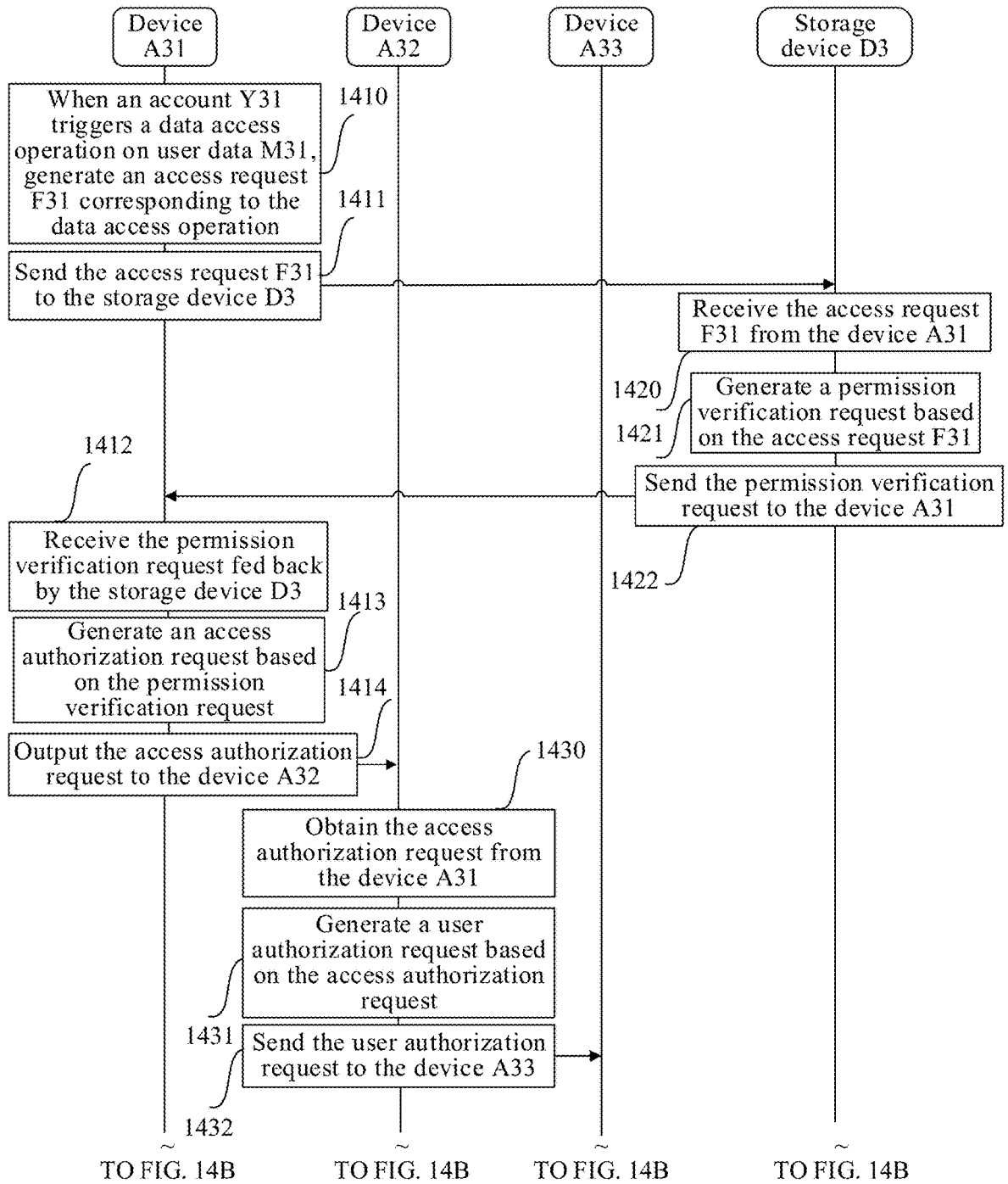
FIG. 14A and FIG. 14B are a timing diagram of data access according to an embodiment of this application.
Figure 14B:
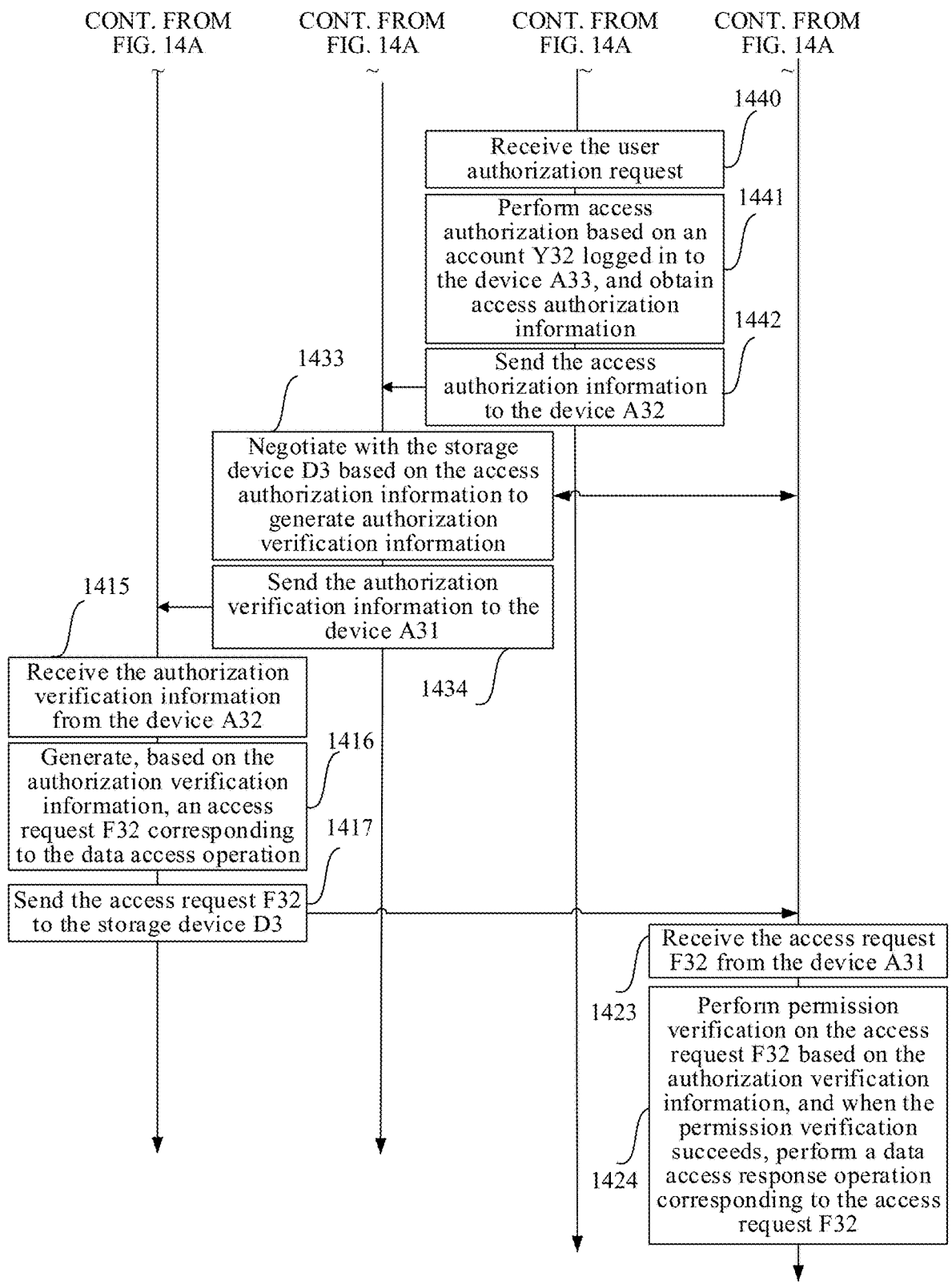

FIG. 14A and FIG. 14B are a timing diagram of data access according to an embodiment of this application. As shown in FIG. 14A and FIG. 14B, the following steps are included:

Step 1410: When an account Y31 logged in to a device A31 triggers a data access operation on user data M31, the device A31 generates an access request F31 corresponding to the data access operation.

Step 1411: The device A31 sends the access request F31 to the storage device D3.

Step 1420: The storage device D3 receives the access request F31 from the device A31.

Step 1421: The storage device D3 generates a permission verification request based on the access request F31.

Step 1422: The storage device D3 sends the permission verification request to the device A31.

Step 1412: The device A31 receives the permission verification request fed back by the storage device D3.

Step 1413: The device A31 generates an access authorization request based on the permission verification request.

Step 1414: The device A31 outputs the access authorization request to the device A32.

Step 1430: The device A32 obtains the access authorization request from the device A31.

Step 1431: The device A32 generates a user authorization request based on the access authorization request.

Step 1432: The device A32 sends the user authorization request to a device A33.

Step 1440: The device A33 receives the user authorization request.

Step 1441: The device A33 performs access authorization based on an account Y32 logged in to the device A33, and generates access authorization information.

Step 1442: The device A33 sends the access authorization information to the device A32.

Step 1433: The device A32 receives the access authorization information, and negotiates with the storage device D3 based on the access authorization information to generate authorization verification information.

Step 1434: The device A32 sends the authorization verification information to the device A31.

Step 1414: The device A31 receives the authorization verification information from the device A32.

Step 1415: The device A31 generates, based on the authorization verification information, an access request F32 corresponding to the data access operation.

Step 1416: The device A31 sends the access request F32 to the storage device D3.

Step 1423: Receive the access request F32 from the device A31.

Step 1424: Perform permission verification on the access request F32 based on the authorization verification information, and when the permission verification succeeds, perform a data access response operation corresponding to the access request F32.

In an actual application scenario, the steps in the foregoing method procedure may be implemented in a plurality of different implementations.

Specifically, in an implementation of step 1441, the access authorization is performed in a manner of user authorization. Specifically, the device A33 outputs an access authorization interface to a user of the account Y32 to obtain user authorization input, and generates the access authorization information based on the user authorization input. For example, the device A33 pops up an authorization request box in a current display interface, to request the current user of the device A33 to perform an authorization operation.

Figure 15:
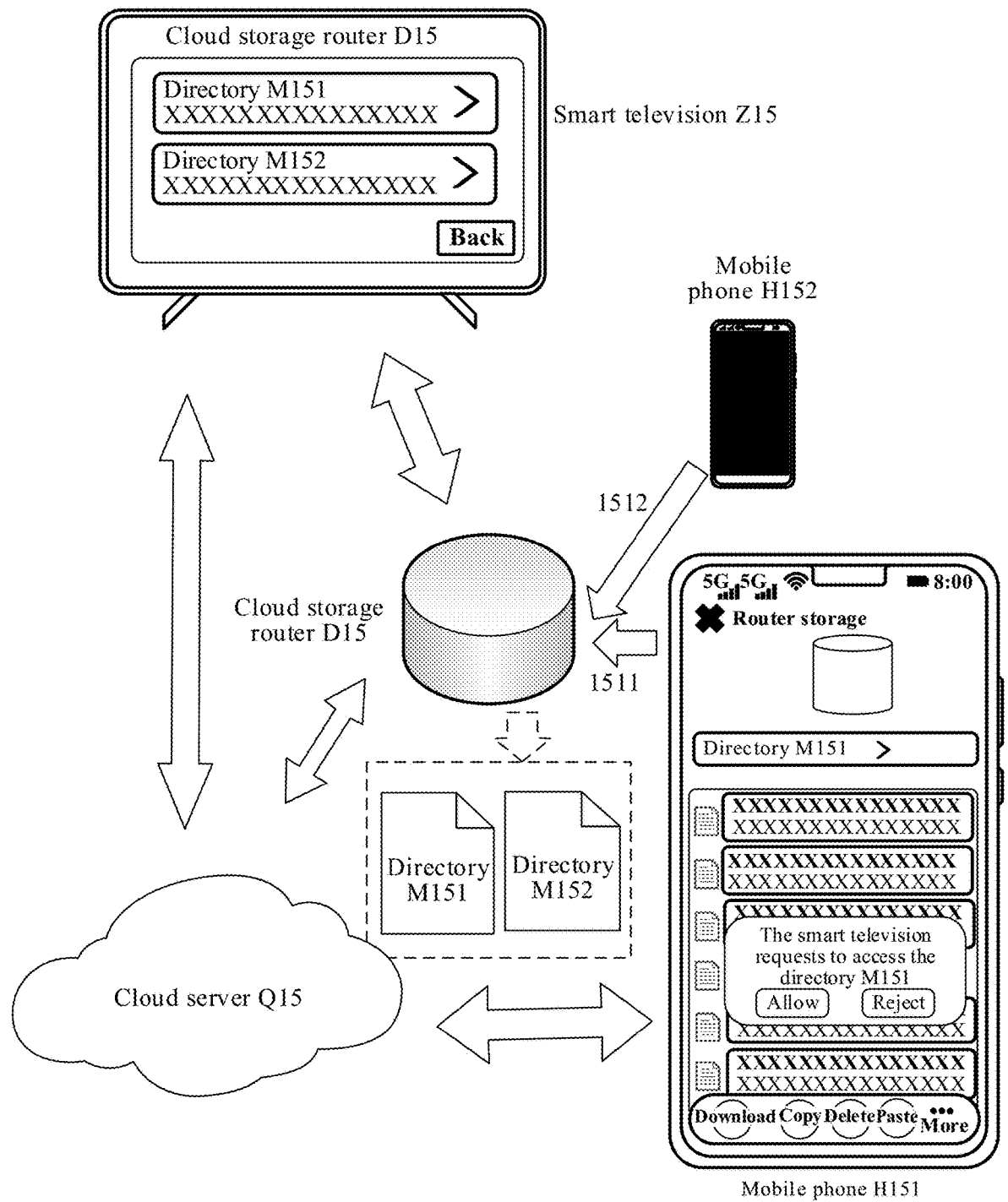
FIG. 15 is a schematic diagram of an application scenario according to an embodiment of this application.

FIG. 15 is a schematic diagram of an application scenario according to an embodiment of this application. As shown in FIG. 15, a cloud storage router D15 and a cloud server Q15 are connected to a home network. A family member M151 uses an own mobile phone H151 (a user account Y151 that is of the family member M151 and that is logged in to the mobile phone H151) to connect to the home network, and stores data on the cloud storage router D15 (1511: write data into a directory M151 of the cloud storage router D15). A family member M152 uses an own mobile phone H152 (a user account Y152 that is of the family member M152 and that is logged in to the mobile phone H152) to connect to the home network, and stores data on the cloud storage router D15 (1512: write data into a directory M152 of the cloud storage router D15).

A smart television Z15 is a public device in the home network. The user account Y151 of the family member M151 or the user account Y152 of the family member M152 may be logged in to the smart television Z15. Alternatively, the smart television Z15 is in a non-login state (where in this case, it is considered that a public account Y153 is logged in to the smart television Z15).

When a family member (which may be the family member M151, the family member M152, or another user other than the family members M151 and M152) uses the smart television Z15 (in the non-login state) to access the directory M151 under the user account Y151 in the cloud storage router D15 (as shown in FIG. 15, a user clicks the directory M151 in the cloud storage router D15), the smart television Z15 generates an access request F151, and sends the access request F151 to the cloud storage router D15.

Because the access request F151 corresponds to the public account Y153, but the public account Y153 does not have access permission for the directory M151, the cloud storage router D15 feeds back a permission verification request to the smart television Z15. The smart television Z15 generates an access authorization request based on the permission verification request fed back by the cloud storage router D15. The smart television Z15 sends the access authorization request to the cloud server Q15.

The cloud server Q15 generates a user authorization request based on the access authorization request, and sends the user authorization request to the mobile phone H151.

Based on the user authorization request, the mobile phone H151 pops up a request authorization button on a display interface, to request the user to perform an access authorization operation (to request the user to click an "Allow" button or a "Reject" button). After the user clicks the "Allow" button, authorization is completed, and the mobile phone H151 generates access authorization information. The mobile phone H151 sends the access authorization information to the cloud server Q15.

The cloud server Q15 sends the access authorization information to the cloud storage router D15, and negotiates with the cloud storage router D15 based on the access authorization information to generate authorization verification information.

The cloud server Q15 sends the authorization verification information to the smart television Z15. The smart television Z15 generates an access request F152 based on the authorization verification information, and sends the access request F152 to the cloud storage router D15.

The cloud storage router D15 verifies the access request F152 based on the authorization verification information, and after the verification succeeds, opens the access permission for the directory M151 to the smart television Z15.

In the application scenario shown in FIG. 15, the access authorization information is generated by the mobile phone H151, the authorization verification information is generated by the cloud server Q15 by negotiating with the cloud storage router D15, and the generation of the access authorization information and the generation of the authorization verification information are separated on two different devices. In this way, security of the access authorization is greatly improved.

Further, when the family member M151 uses the smart television Z15 (the account Y151 logged in) to access the directory M152 under the user account Y152 in the cloud storage router D15, or the family member M152 uses the smart television Z15 (the account Y152 logged in) to access the directory M151 under the user account Y151 in the cloud storage router D15, or the family member M151 uses the mobile phone H151 to access the directory M152 under the user account Y152 in the cloud storage router D15, or the family member M152 uses the mobile phone H152 to access the directory M151 under the user account Y151 in the cloud storage router D15, data access may be performed through steps similar to the foregoing steps.

Further, in an implementation of step 1441, the access authorization may alternatively be performed in a manner of default authorization. Specifically, a device A33 generates access authorization information based on an access permission setting for user data in an account Y32. For example, in the account Y32, a setting of "allowing an account Y31 to access user data M31" is preset. In this case, when receiving a user authorization request, the device A33 may directly generate the access authorization information based on the setting of "allowing an account Y31 to access user data M31" in the account Y32.

Specifically, in an embodiment of this application, an access authorization operation of the device A33 is triggered by the device A31. To be specific, after receiving a permission verification request fed back by a storage device D3, the device A31 generates a user authorization request based on the permission verification request, where the user authorization request is used to request the account Y32 logged in to the device A33 to perform access authorization. After generating the user authorization request, the device A31 outputs the user authorization request to the device A33.

Figure 16A:
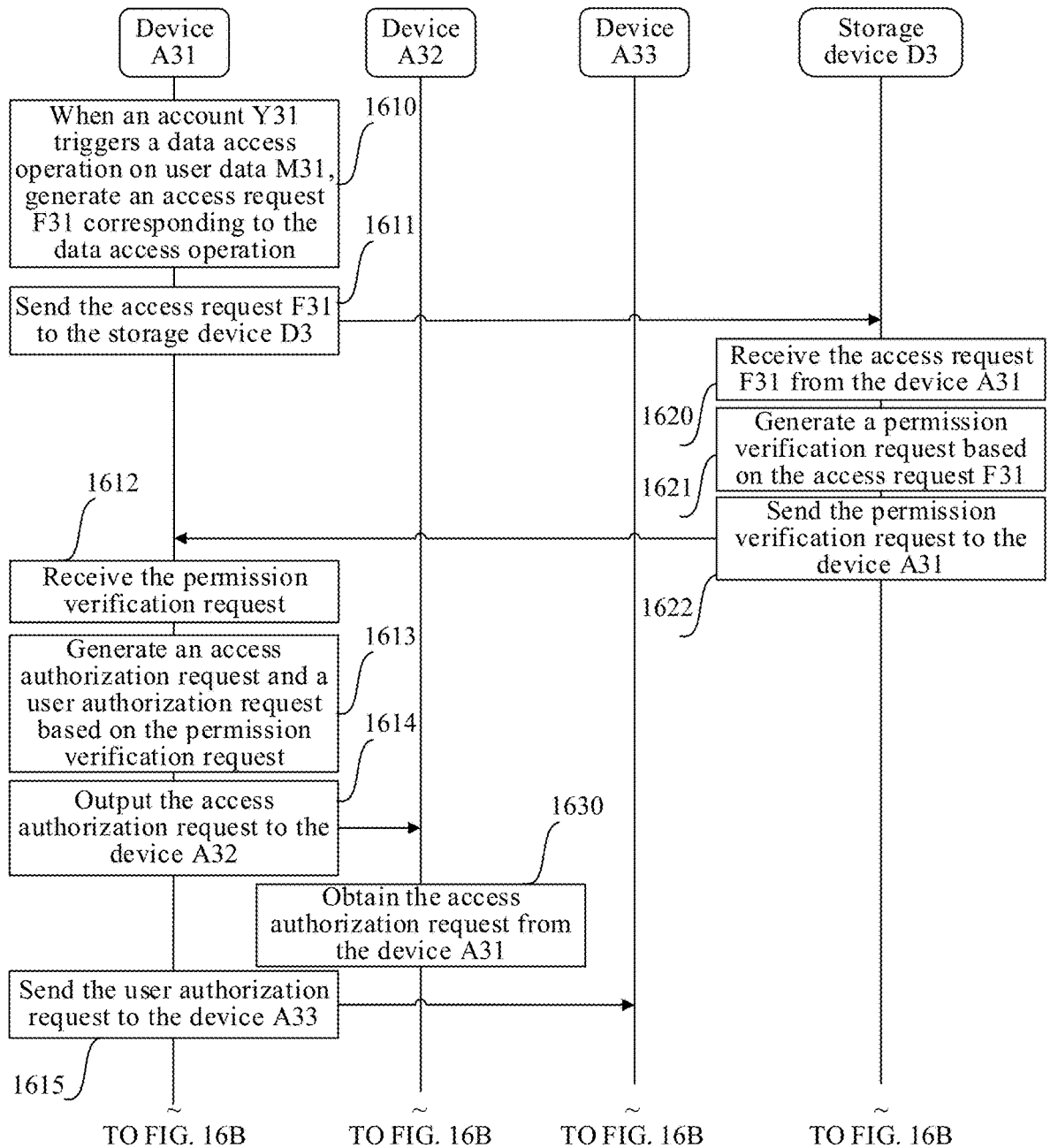
FIG. 16A and FIG. 16B are a timing diagram of data access according to an embodiment of this application.
Figure 16B:
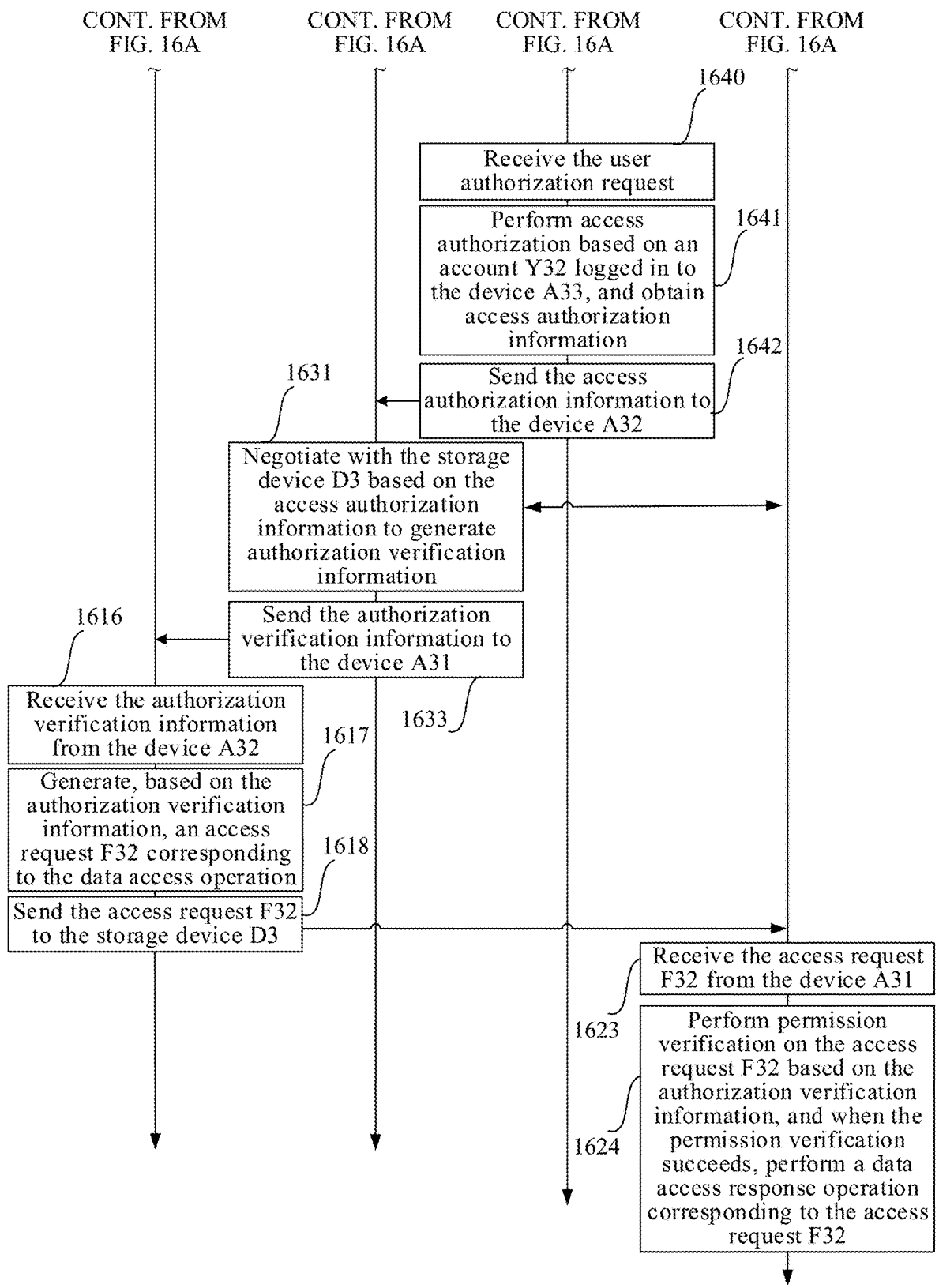

FIG. 16A and FIG. 16B are a timing diagram of data access according to an embodiment of this application. As shown in FIG. 16A and FIG. 16B, the following steps are included:

Step 1610: When an account Y31 logged in to a device A31 triggers a data access operation on user data M31, the device A31 generates an access request F31 corresponding to the data access operation.

Step 1611: The device A31 sends the access request F31 to the storage device D3.

Step 1620: The storage device D3 receives the access request F31 from the device A31.

Step 1621: The storage device D3 generates a permission verification request based on the access request F31.

Step 1622: The storage device D3 sends the permission verification request to the device A31.

Step 1612: The device A31 receives the permission verification request fed back by the storage device D3.

Step 1613: The device A31 generates an access authorization request and a user authorization request based on the permission verification request.

Step 1614: The device A31 outputs the access authorization request to the device A32.

Step 1615: The device A31 outputs the user authorization request to a device A33.

Step 1630: The device A32 obtains the access authorization request from the device A31.

Step 1640: The device A33 receives the user authorization request.

Step 1641: The device A33 performs access authorization based on an account Y32 logged in to the device A33, and generates access authorization information.

Step 1642: The device A33 sends the access authorization information to the device A32.

Step 1631: The device A32 receives the access authorization information, and negotiates with the storage device D3 based on the access authorization information and the access authorization request to generate authorization verification information.

Step 1633: The device A32 sends the authorization verification information to the device A31.

Step 1616: The device A31 receives the authorization verification information from the device A32.

Step 1617: The device A31 generates, based on the authorization verification information, an access request F32 corresponding to the data access operation.

Step 1618: The device A31 sends the access request F32 to the storage device D3.

Step 1623: Receive the access request F32 from the device A31.

Step 1624: Perform permission verification on the access request F32 based on the authorization verification information, and when the permission verification succeeds, perform a data access response operation corresponding to the access request F32.

In an actual application scenario, the steps in the foregoing method procedure may be implemented in a plurality of different implementations.

Specifically, in an implementation of step 1613, the user authorization request is in a form of a two-dimensional code. Specifically, the user authorization request is two-dimensional code data. In an implementation of step 1614, the device A31 presents, to the device A33, the two-dimensional code corresponding to the two-dimensional code data. In an implementation of step 1640, the device A33 obtains the access authorization request by scanning and parsing the two-dimensional code.

Specifically, in an implementation of step 1641, the access authorization is performed in a manner of user authorization. Specifically, the device A33 outputs an access authorization interface to a user of the account Y32 to obtain user authorization input, and generates the access authorization information based on the user authorization input. For example, the device A33 pops up an authorization request box in a current display interface, to request the current user of the device A33 to perform an authorization operation.

Figure 17:
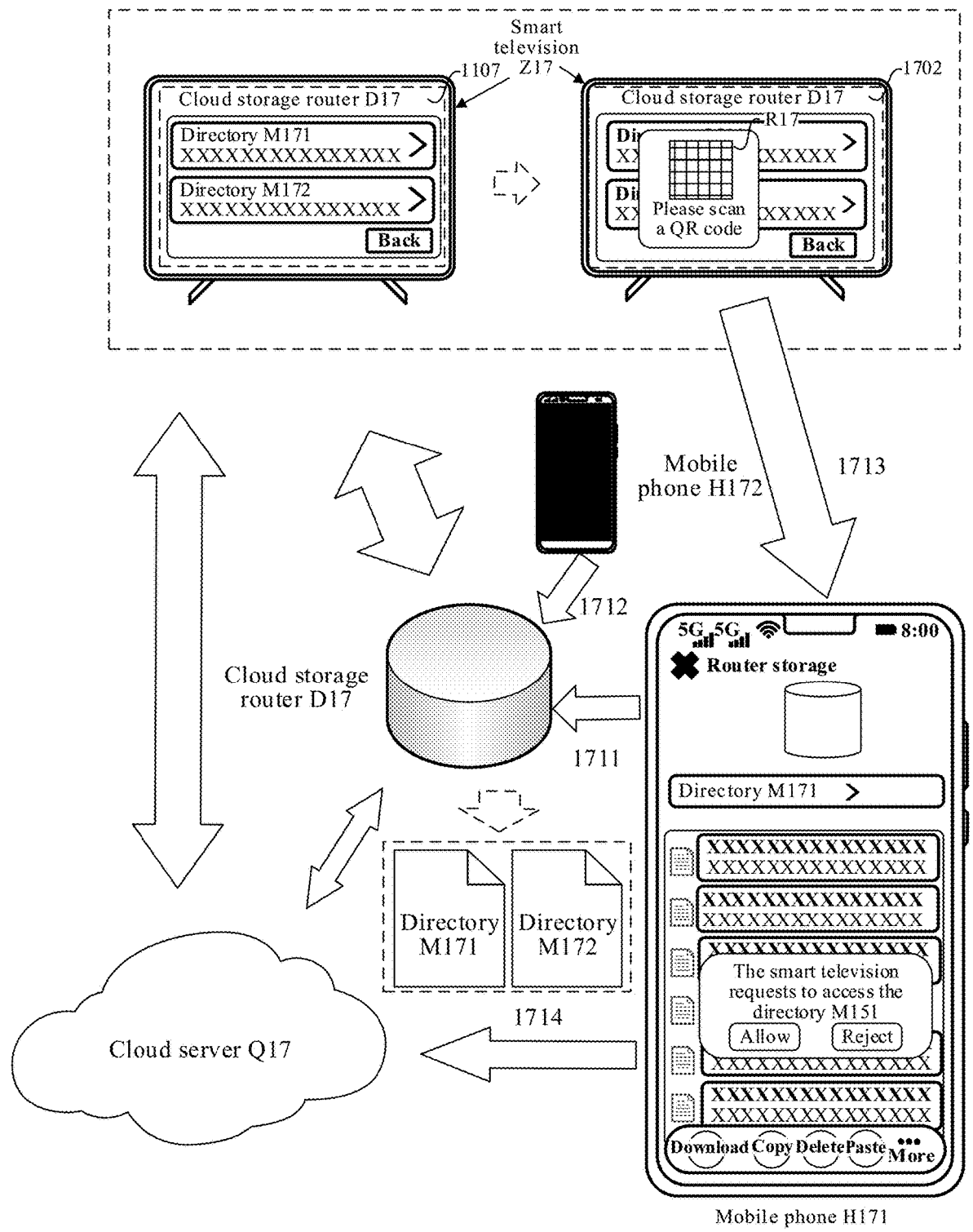
FIG. 17 is a schematic diagram of an application scenario according to an embodiment of this application.

FIG. 17 is a schematic diagram of an application scenario according to an embodiment of this application. As shown in FIG. 17, a cloud storage router D17 and a cloud server Q17 are connected to a home network. A family member M171 uses an own mobile phone H171 (a user account Y171 that is of the family member M171 and that is logged in to the mobile phone H171) to connect to the home network, and stores data on the cloud storage router D17 (1711: write data into a directory M171 of the cloud storage router D17). A family member M172 uses an own mobile phone H172 (a user account Y172 that is of the family member M172 and that is logged in to the mobile phone H172) to connect to the home network, and stores data on the cloud storage router D17 (1712: write data into a directory M172 of the cloud storage router D17).

A smart television Z17 is a public device in the home network. The user account Y171 of the family member M171 or the user account Y172 of the family member M172 may be logged in to the smart television Z17. Alternatively, the smart television Z17 is in a non-login state (where in this case, it is considered that a public account Y173 is logged in to the smart television Z17).

When a family member (which may be the family member M171, the family member M172, or another user other than the family members M171 and M172) uses the smart television Z17 (in the non-login state) to access the directory M171 under the user account Y171 in the cloud storage router D17 (as shown in an interface 1107 in FIG. 17, a user clicks the directory M171 in the cloud storage router D17), the smart television Z17 generates an access request F171, and sends the access request F171 to the cloud storage router D17.

Because the access request F171 corresponds to the public account Y173, but the public account Y173 does not have access permission for the directory M171, the cloud storage router D17 feeds back a permission verification request to the smart television Z17. The smart television Z17 generates an access authorization request and a user authorization request two-dimensional code R17 based on the permission verification request fed back by the cloud storage router D17. The smart television Z17 sends the access authorization request to the cloud server Q17, and presents the user authorization request two-dimensional code R17 (as shown in an interface 1102 in FIG. 17).

The mobile phone H171 scans the user authorization request two-dimensional code R17 (1713), and parses the two-dimensional code to obtain a user authorization request. Based on the user authorization request, the mobile phone H171 pops up a request authorization button on a display interface, to request the user to perform an access authorization operation (to request the user to click an "Allow" button or a "Reject" button). After the user clicks the "Allow" button, authorization is completed, and the mobile phone H171 generates access authorization information. The mobile phone H171 sends the access authorization information to the cloud server Q17.

The cloud server Q17 sends the access authorization information to the cloud storage router D17, and negotiates with the cloud storage router D17 based on the access authorization information and the access authorization request to generate authorization verification information.

The cloud server Q17 sends the authorization verification information to the smart television Z17. The smart television Z17 generates an access request F172 based on the authorization verification information, and sends the access request F172 to the cloud storage router D17.

The cloud storage router D17 verifies the access request F172 based on the authorization verification information, and after the verification succeeds, opens the access permission for the directory M171 to the smart television Z17.

Further, when the family member M171 uses the smart television Z17 (the account Y171 logged in) to access the directory M172 under the user account Y172 in the cloud storage router D17, or the family member M172 uses the smart television Z17 (the account Y172 logged in) to access the directory M171 under the user account Y171 in the cloud storage router D17, or the family member M171 uses the mobile phone H171 to access the directory M172 under the user account Y172 in the cloud storage router D17, or the family member M172 uses the mobile phone H172 to access the directory M171 under the user account Y171 in the cloud storage router D17, data access may be performed through steps similar to the foregoing steps.

Further, in an implementation of step 1641, the access authorization may alternatively be performed in a manner of default authorization. Specifically, a device A33 generates access authorization information based on an access permission setting for user data in an account Y32. For example, in the account Y32, a setting of "allowing an account Y31 to access user data M31" is preset. In this case, when receiving a user authorization request, the device A33 may directly generate the access authorization information based on the setting of "allowing an account Y31 to access user data M31" in the account Y32.

It may be understood that some or all of the steps or operations in the foregoing embodiments are merely examples. In embodiments of this application, other operations or variations of various operations may be further performed. In addition, the steps may be performed in a sequence different from that presented in the foregoing embodiments, and not all the operations in the foregoing embodiments may need to be performed.

Further, usually, an improvement in a technology may be clearly classified into a hardware improvement (for example, an improvement in a circuit structure such as a diode, a transistor, or a switch) or a software improvement (an improvement in a method procedure). However, with development of technologies, improvements in many method procedures today can be considered as direct improvements in hardware circuit structures. Design personnel almost all obtain a corresponding hardware circuit structure by programming an improved method procedure to a hardware circuit. Therefore, it cannot be said that an improvement in a method procedure cannot be implemented by a hardware entity module. For example, a programmable logic device (Programmable Logic Device, PLD) (for example, a field programmable gate array (Field Programmable Gate Array, FPGA)) is such an integrated circuit, and a logic function of the programmable logic device is determined by an accessing party by programming the device. The design personnel program to "integrate" a digital apparatus into one PLD without a need for a chip manufacturer to design and manufacture an application-specific integrated circuit chip. In addition, today, instead of manually making an integrated circuit chip, such programming is also mostly implemented by using "logic compiler (logic compiler)" software. The "logic compiler" software is similar to a software compiler used during program development and writing, and original code to be compiled is also written in a specific programming language that is referred to as a hardware description language (Hardware Description Language, HDL). The HDL does not have merely one type, but has a plurality of types, such as an ABEL (Advanced Boolean Expression Language), an AHDL (Altera Hardware Description Language), Confluence, a CUPL (Cornell University Programming Language), HDCal, a JHDL (Java Hardware Description Language), Lava, Lola, MyHDL, PALASM, and an RHDL (Ruby Hardware Description Language). Currently, a VHDL (Very-High-Speed Integrated Circuit Hardware Description Language) and Verilog are most commonly used. A person skilled in the art should also be aware that, a hardware circuit that implements a logic method procedure can be easily obtained provided that logic programming is slightly performed on the method procedure by using the foregoing several hardware description languages and the method procedure is programmed into an integrated circuit.

Therefore, the method procedure provided in embodiments of this application may be implemented by hardware. For example, a controller is used to control a touchscreen to implement the method procedure provided in embodiments of this application.

The controller may be implemented in any appropriate manner. For example, the controller may take a form of, for example, a microprocessor or a processor, and a computer-readable medium, a logic gate, a switch, an application-specific integrated circuit (Application-Specific Integrated Circuit, ASIC), a programmable logic controller, and an embedded microcontroller that store computer-readable program code (such as software or firmware) that can be executed by the processor (microprocessor). Examples of the controller include but are not limited to the following microcontrollers: ARC 625D, Atmel AT91SAM, Microchip PIC18F26K20, and Silicone Labs C8051F320. A memory controller may also be implemented as a part of a control logic of a memory. A person skilled in the art also knows that, in addition to implementing the controller in a pure computer-readable program code manner, the controller may implement the same function in a form of a logic gate, a switch, an application-specific integrated circuit, a programmable logic controller, an embedded microcontroller, and the like by performing logic programming on the method steps. Therefore, the controller may be considered as a hardware component, and an apparatus that is included in the controller and that is configured to implement various functions may also be considered as a structure in the hardware component. Alternatively, an apparatus configured to implement various functions may be considered as both a software module for implementing a method and a structure in a hardware component.

Further, in the apparatus provided in embodiments of this application, division into modules is merely logical function division. During implementation of embodiments of this application, functions of the modules may be implemented in one or more hardware entities. Specifically, during actual implementation, all or some of the modules in the foregoing apparatus embodiments may be integrated into one physical entity, or may be physically separate. In addition, all of the modules may be implemented in a form of software invoked by a processing element or may be implemented in a form of hardware. Alternatively, some modules may be implemented in a form of software invoked by a processing element, and some modules are implemented in a form of hardware.

For example, a display module may be a separately disposed processing element, or may be integrated into a chip of an electronic device for implementation. Implementations of other modules are similar to the implementation of the display module. In addition, all or some of these modules may be integrated together, or may be implemented separately. In an implementation process, steps of the foregoing methods or the foregoing modules may be implemented by using a hardware integrated logical circuit in the processing element, or by using instructions in a form of software.

For example, the foregoing modules may be configured as one or more integrated circuits for implementing the foregoing methods, for example, one or more application-specific integrated circuits (Application-Specific Integrated Circuits, ASICs), one or more digital signal processors (Digital Signal Processors, DSPs), or one or more field programmable gate arrays (Field Programmable Gate Arrays, FPGAs). For another example, these modules may be integrated together and implemented in a form of a system-on-a-chip (System-On-a-Chip, SOC).

A person of ordinary skill in the art may be aware that the modules and the method steps described in embodiments of this application may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Further, it may be clearly understood by a person skilled in the art that, for the purpose of convenient and brief description, for a detailed working process of the foregoing modules, refer to a corresponding process in the foregoing method embodiments. Details are not described herein again.

An embodiment of this application further provides an electronic device. The electronic device includes a memory configured to store computer program instructions and a processor configured to execute the program instructions, and when the computer program instructions are executed by the processor, the electronic device is triggered to perform the method steps described in embodiments of this application.

Specifically, in an embodiment of this application, the one or more computer programs are stored in the memory, the one or more computer programs include instructions, and when the instructions are executed by the device, the device is enabled to perform the method steps in embodiments of this application.

Specifically, in an embodiment of this application, the processor of the electronic device may be a system-on-a-chip SOC, and the processor may include a central processing unit (Central Processing Unit, CPU), or may further include a processor of another type. Specifically, in an embodiment of this application, the processor of the electronic device may be a PWM control chip.

Specifically, in an embodiment of this application, the processor may include, for example, a CPU, a DSP, a microcontroller, or a digital signal processor, and may further include a GPU, an embedded neural-network processing unit (Neural-network Processing Unit, NPU), and an image signal processor (Image Signal Processor, ISP). The processor may further include a necessary hardware accelerator or a logic processing hardware circuit, for example, an ASIC, or one or more integrated circuits configured to control program execution of the technical solutions in this application. In addition, the processor may have a function of operating one or more software programs. The software program may be stored in a storage medium.

Specifically, in an embodiment of this application, the memory of the electronic device may be a read-only memory (read-only memory, ROM), another type of static storage device that can store static information and instructions, a random access memory (random access memory, RAM), or another type of dynamic storage device that can store information and instructions. The memory may alternatively be an electrically erasable programmable read-only memory (electrically erasable programmable read-only memory, EEPROM), a compact disc read-only memory (compact disc read-only memory, CD-ROM), another compact disc storage, an optical disc storage (including a compact disc, a laser disc, an optical disc, a digital versatile disc, a Blu-ray disc, or the like), a magnetic disk storage medium, another magnetic storage device, or any computer-readable medium that can be used to carry or store expected program code in a form of instructions or a data structure and that can be accessed by a computer.

Specifically, in an embodiment of this application, the processor and the memory may be integrated into one processing apparatus, and more commonly, are components independent of each other. The processor is configured to execute program code stored in the memory to implement the methods in embodiments of this application. During specific implementation, the memory may alternatively be integrated into the processor, or independent of the processor.

Further, the device, apparatus or modules described in embodiments of this application may be specifically implemented by a computer chip or an entity, or may be implemented by a product having a specific function.

A person skilled in the art should understand that embodiments of this application may be provided as a method, an apparatus, a device, or a computer program product. Therefore, the present invention may use a form of hardware only embodiments, software only embodiments, or embodiments with a combination of software and hardware. In addition, the present invention may use a form of a computer program product that is implemented on one or more computer-usable storage media that include computer-usable program code.

In several embodiments of this application, when any of the functions is implemented in a form of a software functional unit and sold or used as an independent product, the functions may be stored in a computer-readable storage medium. Based on such an understanding, the technical solutions of this application essentially, or the part contributing to a current technology, or some of the technical solutions may be implemented in a form of a software product. The software product is stored in a storage medium, and includes several instructions for indicating a computer device (which may be a personal computer, a server, or a network device) to perform all or some of the steps in the methods described in embodiments of this application. Specifically, an embodiment of this application further provides a computer-readable storage medium. The computer-readable storage medium stores a computer program, and when the computer program is run on a computer, the computer is enabled to perform the method provided in embodiments of this application.

An embodiment of this application further provides a computer program product. The computer program product includes a computer program, and when the computer program is run on a computer, the computer is enabled to perform the method provided in embodiments of this application.

Embodiments of this application are described with reference to the flowcharts and/or block diagrams of the method, the device (apparatus), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specified function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specified function in one or more procedures in the flowcharts and/or in one or more blocks in the block diagrams.

The computer program instructions may alternatively be loaded onto a computer or another programmable data processing device, so that a series of operations and steps are performed on the computer or another programmable device, to generate computer-implemented processing. Therefore, the instructions executed on the computer or the another programmable device provide steps for implementing a specified function in one or more procedures in the flowcharts and/or in one or more blocks in the block diagrams.

It should be noted that, in embodiments of this application, "at least one" means one or more, and "a plurality of" means two or more. "And/or" describes an association relationship between associated objects and indicates that three relationships may exist. For example, A and/or B may indicate the following three cases: Only A exists, both A and B exist, and only B exists. A and B may be singular or plural. The character "/" usually indicates an "or" relationship between the associated objects. "At least one of the following items" and a similar expression thereof refer to any combination of these items, including a single item or any combination of plural items. For example, at least one item of a, b, and c may indicate a, b, c, a and b, a and c, b and c, or a, b, and c, where a, b, and c may be singular or plural.

In embodiments of this application, a term "include", "comprise", or any other variant thereof is intended to cover a non-exclusive inclusion, so that a process, a method, an article, or a device that includes a series of elements not only includes those elements but also includes other elements that are not expressly listed, or further includes elements inherent to such a process, method, article, or device. An element preceded by "includes a . . . " does not, without more constraints, preclude the existence of additional identical elements in the process, method, article, or device that includes the element.

This application can be described in the general context of executable computer instructions executed by a computer, for example, a program module. Usually, the program module includes a routine, program, object, component, data structure, and the like for executing a particular task or implementing a particular abstract data type. This application may be practiced in distributed computing environments in which tasks are performed by remote processing devices that are connected through a communication network. In a distributed computing environment, program modules may be located in both local and remote computer storage media including storage devices.

Embodiments in this application are all described in a progressive manner. For same or similar parts in the embodiments, refer to these embodiments. Each embodiment focuses on a difference from other embodiments. Especially, an apparatus embodiment is basically similar to a method embodiment, and therefore is described briefly. For related parts, refer to partial descriptions in the method embodiment.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. A data access method comprising:
when a first account logged in to a current device triggers a data access operation on user data, generating a first access request corresponding to the data access operation, wherein the user data is stored on a storage device and belongs to a second account;
sending the first access request to the storage device;
receiving a permission verification request fed back by the storage device, wherein the permission verification request corresponds to the first access request, and requests to obtain authorization verification information for the data access operation from the current device;
generating an access authorization request based on the permission verification request, wherein the access authorization request requests a first device to negotiate with the storage device based on access authorization information to generate the authorization verification information, and the access authorization information is an authorization result generated by the second account by performing access authorization on the data access operation;
outputting the access authorization request to the first device;
receiving the authorization verification information from the first device;
generating, based on the authorization verification information, a second access request corresponding to the data access operation; and
sending the second access request to the storage device.

2. The method according to claim 1, wherein the first device is a user terminal device to which the second account is logged in, and the access authorization request further requests the second account logged in to the first device to perform the access authorization.

3. The method according to claim 2, wherein the access authorization request comprises two-dimensional code data, and the step of outputting the access authorization request to the first device comprises:
presenting, to the first device, a two-dimensional code corresponding to the two-dimensional code data.

4. The method according to claim 1, wherein a second device is a user terminal device to which the second account is logged in, and the access authorization request further requests the first device to initiate a request authorization operation to the second device, wherein the request authorization operation requests the second account logged in to the second device to perform the access authorization.

5. The method according to claim 1, wherein a second device is a user terminal device to which the second account is logged in, and the method further comprises:
generating a user authorization request based on the permission verification request, wherein the user authorization request requests the second account logged in to the second device to perform the access authorization; and
outputting the user authorization request to the second device.

6. The method according to claim 5, wherein the user authorization request comprises two-dimensional code data, and the step of outputting the user authorization request to the second device comprises:
presenting, to the second device, a two-dimensional code corresponding to the two-dimensional code data.

7. A data access authorization method comprising:
obtaining an access authorization request from a first device, wherein the access authorization request corresponds to a data access operation on user data, the user data is stored on a storage device and belongs to a second account, and the data access operation is triggered by a first account logged in to the first device, the access authorization request requests a current device to negotiate with the storage device based on access authorization information to generate authorization verification information, and the access authorization information is an authorization result generated by the second account by performing access authorization on the data access operation;
obtaining the access authorization information;
negotiating with the storage device based on the access authorization information and the access authorization request to generate the authorization verification information; and
sending the authorization verification information to the first device,
wherein the current device is a user terminal device to which the second account is logged in, and the access authorization request further requests the second account logged in to the current device to perform the access authorization.

8. The method according to claim 7, wherein the step of obtaining the access authorization information comprises:
outputting an access authorization interface to a user of the second account to obtain user authorization input, and generating the access authorization information based on the user authorization input; or
generating the access authorization information based on an access permission setting for the user data in the second account.

9. An electronic device comprising:
a memory storing executable instructions;
a processor configured to execute the executable instructions to perform operations of:
when a first account logged in to the electronic device triggers a data access operation on user data, generating a first access request corresponding to the data access operation, wherein the user data is stored on a storage device and belongs to a second account;
sending the first access request to the storage device;
receiving a permission verification request fed back by the storage device, wherein the permission verification request corresponds to the first access request, and requests to obtain authorization verification information for the data access operation from the current device;
generating an access authorization request based on the permission verification request, wherein the access authorization request requests a first device to negotiate with the storage device based on access authorization information to generate the authorization verification information, and the access authorization information is an authorization result generated by the second account by performing access authorization on the data access operation;
outputting the access authorization request to the first device;
receiving the authorization verification information from the first device;
generating, based on the authorization verification information, a second access request corresponding to the data access operation; and
sending the second access request to the storage device.

10. The electronic device according to claim 9, wherein the first device is a user terminal device to which the second account is logged in, and the access authorization request further requests the second account logged in to the first device to perform the access authorization.

11. The electronic device according to claim 10, wherein the access authorization request comprises two-dimensional code data, and the operation of outputting the access authorization request to the first device comprises:
presenting, to the first device, a two-dimensional code corresponding to the two-dimensional code data.

12. The electronic device according to claim 9, wherein a second device is a user terminal device to which the second account is logged in, and the access authorization request further requests the first device to initiate a request authorization operation to the second device, and wherein the request authorization operation requests the second account logged in to the second device to perform the access authorization.

13. The electronic device according to claim 9, wherein a second device is a user terminal device to which the second account is logged in, and the processor is configured to perform further operations of:
generating a user authorization request based on the permission verification request, wherein the user authorization request requests the second account logged in to the second device to perform the access authorization; and
outputting the user authorization request to the second device.

14. The electronic device according to claim 13, wherein the user authorization request comprises two-dimensional code data, and the operation of outputting the user authorization request to the second device comprises:
presenting, to the second device, a two-dimensional code corresponding to the two-dimensional code data.

* * * * *